(12) United States Patent
Sato

(10) Patent No.: US 6,621,643 B2
(45) Date of Patent: Sep. 16, 2003

(54) ZOOM LENS SYSTEM

(75) Inventor: Haruo Sato, Kawaguchi (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/125,589

(22) Filed: Apr. 19, 2002

(65) Prior Publication Data

US 2003/0002171 A1 Jan. 2, 2003

(30) Foreign Application Priority Data

Apr. 25, 2001 (JP) ......................................... 2000-127816
Apr. 25, 2001 (JP) ......................................... 2000-127830

(51) Int. Cl.⁷ ............................................. G02B 15/14
(52) U.S. Cl. ....................... 359/687; 359/688; 359/690; 359/681; 359/682
(58) Field of Search ................................ 359/687, 688, 359/690, 681, 682

(56) References Cited

U.S. PATENT DOCUMENTS

| | | | |
|---|---|---|---|
| 5,528,423 A | 6/1996 | Arimoto et al. | 359/687 |
| 5,694,253 A | 12/1997 | Shibayama | 359/690 |
| 5,815,321 A | 9/1998 | Shimo | 359/687 |
| 6,118,592 A | 9/2000 | Kohno et al. | 359/686 |
| 6,128,140 A | 10/2000 | Yoneyama | 359/687 |
| 6,353,505 B1 | 3/2002 | Yoneyama | 359/687 |

FOREIGN PATENT DOCUMENTS

| | | |
|---|---|---|
| JP | 1-229217 | 9/1989 |
| JP | 7-113957 | 5/1995 |
| JP | 8-211290 | 8/1996 |
| JP | 8-234108 | 9/1996 |
| JP | 8-248319 | 9/1996 |
| JP | 9-101459 | 4/1997 |
| JP | 2000-75204 | 3/2000 |
| JP | 2000-187161 | 7/2000 |
| JP | 2000-338401 | 12/2000 |

*Primary Examiner*—George Epps
*Assistant Examiner*—M. Hasan
(74) *Attorney, Agent, or Firm*—Miles & Stockbridge P.C.

(57) ABSTRACT

The object is to provide a zoom lens system with an angle of view 2ω of about 74.1° to 11.8°, a zoom ratio of about 6.6, ultimately small in diameter and compact, being composed of less number of elements, and having high cost performance and superb optical performance. The system includes, in order from an object, a first lens group having positive refractive power, a second lens group having negative refractive power, at least one lens group, and a lens group Gm having positive refractive power as a whole. Zooming is carried out by changing an air space between the first lens group and the second lens group. The lens group Gm consists of, in order from the object, a positive lens component having a convex surface facing to an image side and a negative lens component having a concave surface facing to the object side. Particular conditions are satisfied.

34 Claims, 20 Drawing Sheets

ZOOM LENS SYSTEM

This application claims the benefit of Japanese Patent applications No. 2001-127816 and No. 2001-127830 which are hereby incorporated by reference.

BACKGROUND OF THE INVENTION

1. Field of the Invention

The present invention relates to a zoom lens system having a high zoom ratio, a light weight, compactness and good cost performance and, in particular, to a compact standard zoom lens system having a high zoom ratio.

2. Related Background Art

In recent years, a so-called standard zoom lens with a zoom ratio of 3 to 4 including a wide-angle end state has steadily become smaller its dimension and lower the manufacturing cost. Since the lens system is mounted on the camera body as the regularly used lens, it is essential to have compactness, lightweight, satisfactory imaging performance, and reasonable manufacturing cost. In order to satisfy the above-described requirements, it is necessary for each lens group to have strong refractive power and to be thinner as much as possible.

For example, zoom lens systems having four lens groups of positive-negative-positive-positive arrangement from the object side have been proposed in Japanese Patent Application Laid-Open Nos. 1-229217, 8-248319, 9-101459, 2000-075204, 2000-187161, 7-113957, 2000-338401.

However, the zoom lens systems disclosed in the above-mentioned publications mainly have the zoom ratio of about 3 to 4. Even the zoom lens system having a high zoom ratio has been large in dimension, has a large number of elements. In addition, the optical performance has not been satisfactory. Accordingly, a compact zoom lens system, as the present invention, being downsized ultimately having a zoom ratio of more than 6.62, which corresponds to 28 mm to 200 mm in the 35 mm film format, has not been existed.

SUMMARY OF THE INVENTION

The present invention is made in view of the aforementioned problems and has an object to provide a zoom lens system with an angle of view $2\omega$ of about 74.1° to 11.8° and a zoom ratio of about 6.6, being ultimately small in diameter and compact, being composed of less number of elements, and having high cost performance and superb optical performance.

According to one aspect of the present invention, a zoom lens system includes, in order from an object, a first lens group G1 having positive refractive power, a second lens group G2 having negative refractive power, at least one lens group, and a lens group Gm having positive refractive power as a whole. The focal length of the zoom lens system is varied by changing an air space between the first lens group G1 and the second lens group G2. The lens group Gm consists of, in order from the object, a positive lens component L1 having a convex surface facing to an image side and a negative lens component L2 having a concave surface facing to the object side. The following conditional expression (1) is satisfied:

$$0.10 < \Sigma dw/ft < 0.54 \tag{1}$$

where $\Sigma dw$ denotes a distance along the optical axis between the vertex of the object side surface of the most object side lens element and that of the image side surface of the most image side lens element in a wide-angle end state and ft denotes the focal length of the zoom lens system in a telephoto end state.

In one preferred embodiment, the following conditional expression (2) is satisfied:

$$0.20 < f1/ft < 0.55 \tag{2}$$

where f1 denotes the focal length of the first lens group G1.

In one preferred embodiment, the following conditional expression (3) is satisfied:

$$0.03 < |f2|/ft < 0.20 \tag{3}$$

where f2 denotes the focal length of the second lens group G2.

In one preferred embodiment, the following conditional expression (4) is satisfied:

$$0.23 < dpn/dm < 0.90 \tag{4}$$

where dpn denotes a distance along the optical axis between the image side vertex of the positive lens component L1 and the object side vertex of the negative lens component L2 in the lens group Gm, and dm denotes a distance along the optical axis between the object side vertex of the most object side lens element and the image side vertex of the most image side lens element of the lens group Gm.

In one preferred embodiment, at least one aspherical surface is included in either the positive lens component L1 or the negative lens component L2 in the lens group Gm.

In one preferred embodiment, the at least one lens group consists only of a third lens group G3 having positive refractive power. The following conditional expression (5) is satisfied:

$$0.2 < f3/fm < 1.0 \tag{5}$$

where f3 denotes the focal length of the third lens group G3 and fm denotes the focal length of the lens group Gm.

In one preferred embodiment, at least one aspherical surface is included in both positive lens component L1 and negative lens component L2 in the lens group Gm. At least one of the aspherical surfaces has a shape that that positive refractive power of a single lens element becomes weak or negative refractive power of a single lens element becomes strong as the height goes from the optical axis to the periphery of the lens element.

In one preferred embodiment, the positive lens component L1 in the lens group Gm is constructed by double aspherical surfaces, and wherein the image side surface of the double aspherical lens has a shape that the curvature in the periphery of the effective aperture becomes larger than that on the optical axis.

In one preferred embodiment, the negative lens component L2 in the lens group Gm has at least one aspherical surface. The aspherical surface has a shape that the negative refractive power in the most peripheral part of the effective aperture becomes stronger than that on the optical axis.

In one preferred embodiment, the second lens group G2 has at least one negative lens element and at least one positive lens element. The following conditional expressions (6) and (7) are satisfied:

$$np < 1.85 \tag{6}$$

$$vp < 27 \tag{7}$$

where np denotes refractive index of the positive lens element at d-line and vp denotes Abbe number of the positive lens element.

According to another aspect of the present invention, a zoom lens system includes, in order from an object, a first lens group G1 having positive refractive power, a second lens group G2 having negative refractive power, at least one lens group, and a lens group Gm having positive refractive power. The focal length of the zoom lens system is varied by changing an air space between the first lens group G1 and the second lens group G2. The lens group Gm consists of, in order from the object, a positive lens component L1 having a convex surface facing to an image side and a negative lens component L2. The negative lens component L2 includes a positive lens element La and a negative lens element Lb. The following conditional expression (8) is satisfied:

$$0.10 < \Sigma dw/ft < 0.54 \quad (8)$$

where $\Sigma dw$ denotes a distance along the optical axis between the vertex of the object side surface of the most object side lens element and that of the image side surface of the most image side lens element in a wide-angle end state and ft denotes the focal length of the zoom lens system in a telephoto end state.

In one preferred embodiment, the following conditional expression (9) is satisfied:

$$0.20 < f1/ft < 0.85 \quad (9)$$

where f1 denotes the focal length of the first lens group G1.

In one preferred embodiment, the positive lens component L1 in the lens group Gm having a convex surface facing to the object has at least one aspherical surface. The aspherical surface has a shape that the curvature becomes small as the height goes from the optical axis to the periphery of the lens element.

In one preferred embodiment, the positive lens component L1 in the lens group Gm having a convex surface facing to the object has aspherical surfaces on both object side and image side. The object side surface of the aspherical surfaces has a shape that the curvature becomes large as the height goes from the optical axis to the periphery of the lens element. The image side surface of the aspherical surfaces has a shape that the curvature becomes small as the height goes from the optical axis to the periphery of the lens element.

In one preferred embodiment, the following conditional expression is satisfied:

$$0.10 < nb-na \quad (10)$$

where na denotes refractive index of the positive lens element La in the negative lens component L2 in the lens group Gm at d-line and nb denotes that of the negative lens element Lb in the negative lens component L2 in the lens group Gm at d-line.

In one preferred embodiment, the positive lens element La and the negative lens element Lb in the negative lens component L2 in the lens group Gm are cemented with each other.

DESCRIPTION OF THE PREFERRED EMBODIMENTS

Figure 1:
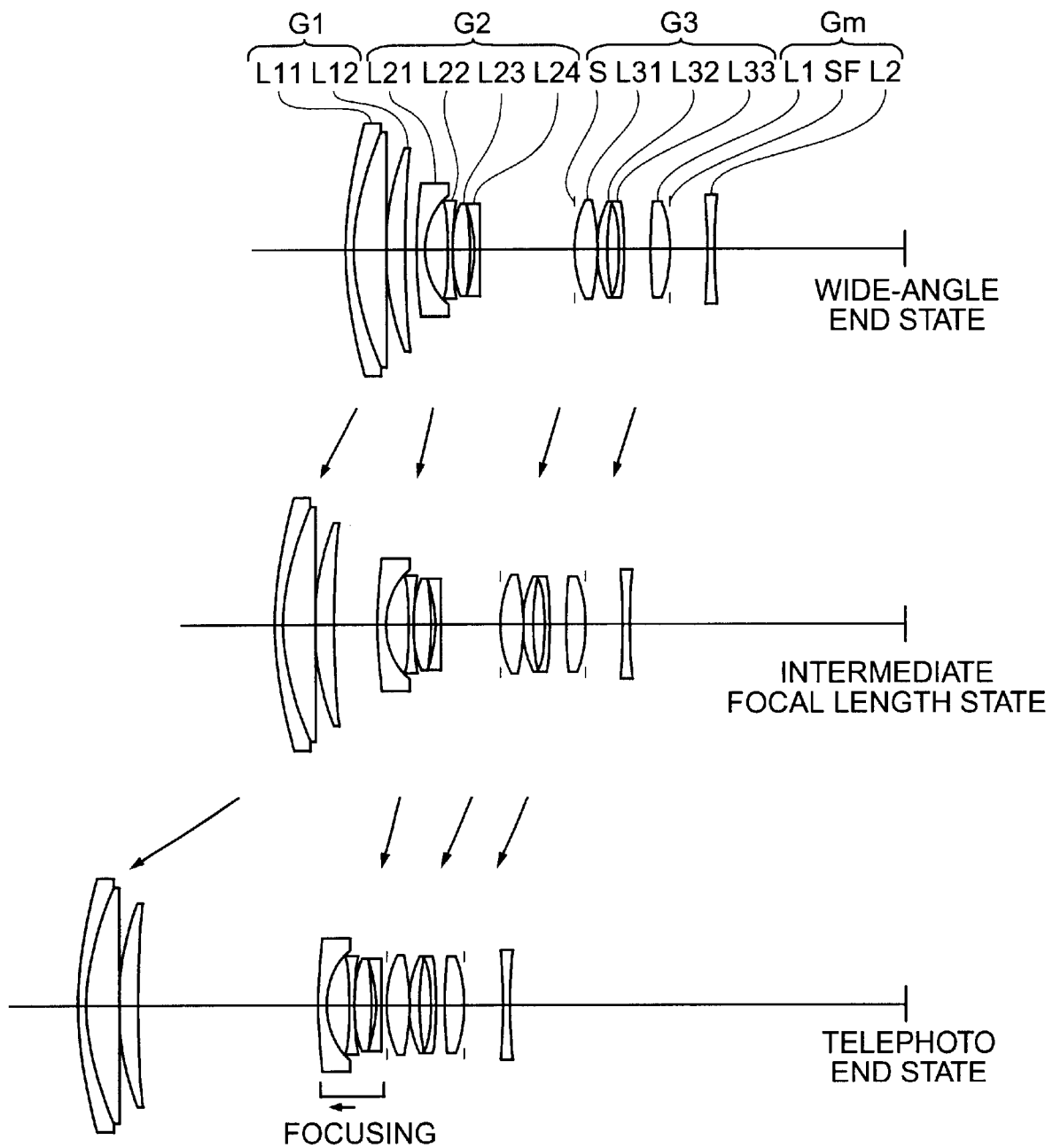
FIG. 1 is a diagram showing the lens arrangement of a zoom lens system according to Example 1 of a first embodiment of the present invention, together with the movement of each lens group during zooming.

Conventional design policy for a 28 to 200 mm zoom lens has adopted the design that power of each lens group is increased, and the number of lens elements is also increased so as to correct aberrations. However, this design policy brings an increase of weight because each lens group becomes thick resulting from the additional number of lens elements. Moreover, dead space between adjacent lens groups decreases, so that it tends to become large. Therefore, it is necessary for further downsizing to adopt completely different designing policy.

The present invention introduces a new design method that eliminates useless lens elements and minimizes the number of elements consisting of each lens group. Using this effect makes it possible to miniaturize the zoom lens system by making each lens group thin without setting forcible power arrangement.

(First Embodiment)

It is particularly important for the first embodiment that a rear lens group (master lens group), which is the rear lens group of a positive-lens-leading zoom lens represented typically by four unit zoom lenses having positive-negative-positive-positive arrangement, consists only of two lens elements composed of a positive element and a negative element, which are the minimum number of lens elements for correcting chromatic aberration and other aberrations. This construction is a basic construction of a telephoto type. The construction of the embodiment is essential condition to make the rear (master) lens group extremely thinner and to make the back focal length shorter. This construction has made it possible to realize minimizing elements such as the size of the filter, the diameter of the lens system, and the total lens length.

The characteristics of the present invention will be explained below in accordance with each conditional expression.

Conditional expression (1) defines the total lens length, excluding the back focal length from the optical lens length, of the zoom lens system normalized by the focal length of the zoom lens system in a telephoto end state.

When the ratio $\Sigma dw/ft$ exceeds the upper limit of conditional expression (1), the total lens length of the zoom lens system becomes too thick. As a result, the compactness that is the purpose of the present invention cannot be accomplished by the lens construction according to the present invention. Moreover, the weight including the lens barrel becomes heavier and the cost of the material also increases, so that it becomes unattractive as a common, high-zoom-ratio zoom lens.

When the upper limit of conditional expression (1) is set to be less than 0.50, a common, high-zoom-ratio zoom lens can be realized with lower manufacturing cost. Moreover, when the upper limit of conditional expression (1) is set to be less than 0.47, a common high-zoom-ratio zoom lens can be realized with even lower manufacturing cost. When the upper limit of conditional expression (1) is set to be less than 0.45, the maximum optical performance of the present invention can be expected.

On the other hand, when the ratio falls below the lower limit of conditional expression (1), the total lens length of the zoom lens system becomes extremely narrow. As a result, the back focal length becomes short, so that the zoom lens system cannot be virtually used as an interchangeable lens of a single lens reflex camera. Since each lens group is necessary to have extremely strong power, correction of aberration becomes difficult. As a result, it becomes impossible to make the zoom ratio high, so that it is undesirable.

When the lower limit of conditional expression (1) is set to be more than 0.20, the maximum optical performance of the present invention can be expected.

Conditional expression (2) defines the focal length of the first lens group normalized by that of the zoom lens system in the telephoto end state. To optimize the focal length of the first lens group is important condition for realizing a good aberration correction and for settling the length of the zoom lens system.

When the ratio f1/ft exceeds the upper limit of conditional expression (2), it means the power of the first lens group becomes weak, so that the total lens length of the zoom lens system becomes large. This is undesirable. Moreover, in a high-zoom-ratio zoom lens system like the present invention, the total lens length varies drastically in the telephoto state, so that it becomes difficult to carve a curve for a cam on a lens barrel. It becomes impossible to realize the zoom lens system. In the case with extremely fewer lens elements like the present invention, it becomes more important to set optimum Petzval summation. When the power of the first lens group is decreased, Petzval summation becomes smaller, so that it becomes difficult to correct curvature of field and astigmatism. This is undesirable.

When the upper limit of conditional expression (2) is set to be less than 0.50, it becomes possible to set better Petzval summation. Moreover, when the upper limit of conditional expression (2) is set to be less than 0.48, the maximum optical performance of the present invention can be expected.

On the other hand, when the ratio falls below the lower limit of conditional expression (2), it means refractive power of the first lens group becomes extremely large. The increase of refractive power of the first lens group has the effect that the light ray entered to the front lens at large angle of view is further lowered to the periphery of the lens. Therefore, light quantity in the periphery of the field decreases. As a result, the diameter of the front lens and that of the filter become large, so that it is undesirable. Moreover, in the correction of aberration, peripheral coma in the wide-angle state and spherical aberration in the telephoto state become worse, so that it is undesirable.

When the lower limit of conditional expression (2) is set to be more than 0.30, the maximum optical performance of the present invention can be expected. Conditional expression (3) defines absolute value of the focal length of the second lens group normalized by the focal length of the zoom lens system in the telephoto end state.

When the ratio $|f2|/ft$ exceeds the upper limit of conditional expression (3), it means negative refractive power of the second lens group becomes weak. In this case, the moving amount of the second lens group becomes large, so that the zoom lens system becomes large. Moreover, the light ray entered to the front lens at large angle of view is further lowered to the periphery of the lens. Therefore, light quantity in the periphery of the field decreases. As a result, the diameter of the front lens and that of the filter become large, so that it is undesirable.

When the upper limit of conditional expression is set to be less than 0.10, the lens system can be more compact. When the upper limit of conditional expression is set to be less than 0.085, the maximum optical performance of the present invention can be expected.

On the other hand, when the ratio falls below the lower limit of conditional expression (3), it means refractive power of the second lens group becomes extremely strong. In this case, Petzval summation becomes smaller than the appropriate value, so that it becomes difficult to correct curvature of field and astigmatism. This is undesirable. Moreover, off-axis aberrations as well as distortion in the wide-angel end state become difficult to correct, so that it is undesirable.

Moreover, it is desirable that either the positive lens component L1 or the negative lens component L2 in the lens group Gm has at least one aspherical surface. When the lens group Gm is constructed to be extremely narrow and to be constructed by the minimum number of lens elements capable of correcting chromatic and other aberrations, in order to exhibit maximum performance of the present invention, it is particularly desirable that correction of aberrations is carried out by introducing aspherical surfaces. In a high-zoom-ratio zoom lens system like the present invention, it is very important point for compactness and high optical performance to correct spherical aberration in the telephoto state and upper coma by introducing aspherical surfaces.

Furthermore, in order to exhibit maximum performance of the present invention, it is desirable that the zoom lens system has basic construction of a four unit zoom lens having positive-negative-positive-positive arrangement so as to balance compactness with high optical performance.

Conditional expression (4) defines an appropriate amount of the distance between the two lens elements of the lens group Gm. When the lens elements are constructed by a positive element and a negative element as the present invention, the air distance controls the principal points of the lens group as a whole, securing the dead space with respect to the lens group locating directly before, setting the back focal length at an appropriate value, accomplishing both compactness and a high zoom ratio, keeping refractive powers of both lens elements, and realizing good aberration correction.

When the ratio dpn/dm exceeds the upper limit of conditional expression (4), the total lens length of the zoom lens system becomes large and the back focal length becomes short, so that they are undesirable.

On the other hand, when the ratio falls below the lower limit of conditional expression (4), it means refractive power of both lens elements becomes strong. In this case, correction of various aberrations as well as spherical aberration both in the wide-angle end state and in the telephoto end state becomes worse, so that it is undesirable. Moreover, as a matter of manufacturing, a portion of lens elements having an extremely fine decentering tolerance comes out, so that it becomes difficult to manufacture. This is undesirable. In addition, the image side surface of the most image side lens becomes extremely concave to the image. Accordingly, unless otherwise accomplished an extremely long back focal length relative to the normal one, the zoom lens system causes mechanical interference with a so-called quick return mirror of a single lens reflex camera, so that it cannot be used.

When the lower limit of conditional expression (4) is set to be more than 0.30, various aberrations such as spherical aberration can be corrected well. Moreover, when the lower limit of conditional expression (4) is set to be more than 0.58, the maximum optical performance of the present invention can be expected.

Furthermore, in the preferred embodiment of the present invention, it is preferable that the aforementioned at least one lens group is composed only of a third lens group G3 having positive refractive power and that the following conditional expression (5) is satisfied:

$$0.2 < f3/fm < 1.0 \quad (5)$$

where f3 denotes the focal length of the third lens group G3, and fm denotes the focal length of the lens group Gm.

Conditional expression (5) defines the power ratio of the third lens group to the fourth lens group. In order to correct various aberrations, it is necessary that refractive power of the third lens group is stronger than that of the fourth lens group. It is desirable that the ratio satisfies the condition for correcting particularly spherical aberration in the telephoto end state.

When the ratio exceeds the upper limit of conditional expression (5), it means the power of the fourth lens group becomes stronger than that of the third lens group. In this case, spherical aberration and coma in the telephoto state becomes extremely worse, so that a compact, high-zoom-ratio zoom lens system as the present invention cannot be realized.

When the upper limit of conditional expression (5) is set to be less than 0.8, various aberrations such as spherical aberration can be corrected well. In addition, when the upper limit of conditional expression is set to be less than 0.6, the maximum optical performance of the present invention can be expected.

On the other hand, when the ratio falls below the lower limit of conditional expression (5), it means the power of the third lens group becomes stronger than that of the fourth lens group. In this case, various aberrations as well as spherical aberration in both wide-angle state and telephoto state become worse. This is undesirable. Moreover, as a matter of manufacturing, a portion of lens elements having an extremely fine decentering tolerance comes out, so that it becomes difficult to manufacture. This is undesirable.

When the lower limit of conditional expression (5) is set to be more than 0.3, various aberrations such as spherical aberration can be corrected well. In addition, when the lower limit of conditional expression (5) is set to be more than 0.35, the maximum optical performance of the present invention can be expected.

Then, aspherical surfaces introduced in the present invention are explained. In order to exhibit the maximum optical performance of the present invention, it is desirable that at least one aspherical surface is arranged in each of positive lens component L1 and negative lens component L2 of the lens group Gm, wherein the aspherical surface has a shape that positive refractive power of the single lens element becomes weak or negative refractive power of the single lens element becomes strong as the height goes from the optical axis to the periphery of the lens element.

This technique is quite effective for a compact zoom lens system having a high zoom ratio such as the present invention. As described above, in the present invention that the lens group Gm is made to be extremely narrow and is constructed by the minimum number of elements for correcting chromatic and other aberrations, by introducing aspherical surfaces into both positive lens component L1 and negative lens component L2, degree of freedom for designing can be obtained such that various off-axis aberrations such as coma as well as spherical aberration are corrected well and that the back focal length and dead spaces between respective lens groups are arranged ideally.

The shape that positive refractive power of the single lens element becomes weak or negative refractive power of the single lens element becomes strong as the height goes from the optical axis to the periphery of the lens element is capable to correct negative spherical aberration well. This is for correcting spherical aberration of the lens group Gm itself well and, as a result, it makes it possible to cope with a lens system having small f-number.

In order to exhibit the maximum optical performance of the present invention, it is desirable that the positive lens component L1 in the lens group Gm is constructed by double aspherical surfaces and that the image side aspherical surface of the double aspherical lens has a shape that the curvature in the periphery of the effective aperture becomes larger than that on the optical axis. As described above, this is for correcting spherical aberration of the lens group Gm itself well and for enhancing the effect to correct various off-axis aberrations. Because both aspherical surfaces are separated with each other by the thickness of the lens, the each aspherical surface has different height and angle of deviation with respect to each incident ray. By using the different height and angle of deviation for designing each aspherical surface, a plurality of aberrations can be corrected at the same time.

Furthermore, it is desirable that the negative lens component L2 of the lens group Gm has at least one aspherical surface, wherein the aspherical surface has a shape that the negative refractive power in the most peripheral part of the effective aperture becomes stronger than that on the optical axis. This is mainly effective to correct off-axis aberration such as curvature of field in the wide-angle end state and coma in the telephoto end state.

Furthermore, it is desirable for the present invention that the second lens group G2 has at least one negative lens element and at least one positive lens element, and the following conditional expressions (6) and (7) are satisfied:

$$np<1.85 \quad (6)$$

$$vp<27 \quad (7)$$

where np denotes refractive index of the positive lens element at d-line and vp denotes Abbe number of the positive lens element.

Conditional expressions (6) and (7) define an appropriate range of the glass material of the positive lens element of the second lens group.

Conditional expression (6) defines appropriate value of refractive index at the d-line.

When the value exceeds the upper limit of conditional expression (6), the positive refractive power becomes excessively strong, so that if the second lens group is used with relatively strong power, it becomes difficult to settle Petzval summation in the optimum value. This is undesirable.

In addition, when the upper limit of conditional expression (6) is set to be less than 1.84 or 1.83, the maximum optical performance of the present invention can be expected.

Conditional expression (7) defines an appropriate value of Abbe number. When the value exceeds the upper limit of conditional expression (7), variations of axial chromatic aberration and lateral chromatic aberration upon zooming cannot be corrected well, so that it is undesirable.

Examples according to the first embodiment of the present invention are going to be explained below with reference to accompanying drawings.

EXAMPLE 1

FIG. 1 is a diagram showing the lens arrangement of a zoom lens system according to Example 1 of a first embodiment of the present invention, together with the movement of each lens group during zooming.

A zoom lens system according to Example 1 of the first embodiment is composed of four lens groups having positive-negative-positive-positive arrangement. The zoom lens system consists of, in order from an object, a first lens group G1 having positive refractive power, a second lens group G2 having negative refractive power, a third lens group G3 having positive refractive power, and a fourth lens group Gm having positive refractive power.

The first lens group G1 consists of, in order from the object, a cemented positive lens L11 constructed by a negative meniscus lens having a convex surface facing to the object side cemented with a positive lens, and a positive meniscus lens L12 having a convex surface facing to the object side. The second lens group G2 consists of, in order from the object, a negative meniscus composite lens L21 composed of glass and resin materials having an aspherical surface facing to the object side, a double concave negative lens L22, a double convex positive lens L23, and a double concave negative lens L24. The third lens group G3 consists of, in order from the object, an aperture stop S, a double convex positive lens L31, a positive meniscus lens L32, and a negative meniscus lens L33 having a concave surface facing to the object side. The fourth lens group Gm consists of, in order from the object, a double convex positive lens L1 having aspherical surfaces on both sides, a fixed stop SF, and a negative composite lens L2 composed of glass and resin materials having an aspherical surface facing to the object side.

When the state of lens group positions is changed from a wide-angle end state to a telephoto end state, all lens groups are moved independently such that the space between the first lens group G1 and the second lens group G2 increases, the space between the second lens group G2 and the third lens group G3 decreases, and the space between the third lens group G3 and the fourth lens group Gm decreases. The focusing from the infinity to a closer object is carried out by moving the second lens group G2 to the object side.

Various values associated with Example 1 are listed in Table 1. In Table 1, f denotes the focal length, FNO denotes the f-number, 2ω denotes an angle of view. In Lens Data, ri denotes radius of curvature of an optical surface Ri, di denotes a distance along the optical axis between optical surfaces Ri and Ri+1, ni denotes refractive index of a medium between optical surfaces Ri and Ri+1 at d-line, vi denotes Abbe number of a medium between optical surfaces Ri and Ri+1, and BF denotes the back focal length. In aspherical data, E-n denotes "×10$^{-n}$".

An aspherical surface in each Table is expressed by the following expression:

$$S(y)=(\text{i } y^2/R)/[1+(1-k\cdot y^2/R^2)^{1/2}]+C3\cdot|y|^3+C4\cdot y^4+C5\cdot|y|^5+C6\cdot y^6+C8\cdot y^8+C10\cdot y^{10}+C12\cdot y^{12}+C14\cdot y^{14}$$

where y denotes the height in a vertical direction relative to the optical axis, S(y) denotes the distance along the optical axis from the tangent plane on the vertex of the aspherical surface to the position of the aspherical surface at the height of y (a sag amount), R denotes a reference radius of curvature, K denotes the conical coefficient, and Cn denotes an aspherical coefficient of n-th order.

In lens data, an asterisk "*" is attached to the right side of the surface number of an aspherical surface and the paraxial radius of curvature is listed in the column "r".

In "Variable intervals upon zooming", β denotes the imaging magnification of an image relative to an object, 1-POS denotes the state focusing at infinity in the wide-angle end state, 2-POS denotes the state focusing at infinity in an intermediate focal length state, 3-POS denotes the state focusing at infinity in the telephoto end state, 4-pos denotes the state with imaging magnification β=−0.03333 in the wide-angle end state, 5-POS denotes the state with imaging magnification β=−0.03333 in the intermediate focal length state, 6-POS denotes the state with imaging magnification β=−0.03333 in the telephoto end state, 7-POS denotes the state focusing at a close object in the wide-angle end state, 8-POS denotes the state focusing at a close object in the intermediate focal length state, and 9-POS denotes the state focusing at a close object in the telephoto end state.

In the tables for various values, "mm" is generally used for the unit of length such as the focal length, the radius of curvature, and the separation between optical surfaces. However, since an optical system proportionally enlarged or reduced its dimension can be obtained similar optical performance, the unit is not necessary to be limited to "mm" and any other suitable unit can be used.

The above-mentioned explanation can be applied to any other examples in the present invention.

TABLE 1

(Specifications)
f: 29.1~192 mm
2ω: 74.1°~11.8°
FNO: 3.6~5.9

(Lens Data)

| | r | d | ν | n |
|---|---|---|---|---|
| 1) | 85.2964 | 1.8000 | 23.78 | 1.846660 |
| 2) | 52.3479 | 6.8000 | 60.09 | 1.640000 |
| 3) | −11096.9620 | 0.1000 | | 1.000000 |
| 4) | 57.2728 | 3.8500 | 82.52 | 1.497820 |
| 5) | 232.6502 | D5 | | 1.000000 |
| 6)* | 113.7061 | 0.0500 | 38.09 | 1.553890 |
| 7) | 98.4767 | 1.6000 | 42.72 | 1.834810 |
| 8) | 15.1317 | 4.8000 | | 1.000000 |
| 9) | −49.0060 | 0.9000 | 49.61 | 1.772500 |
| 10) | 59.9897 | 0.1000 | | 1.000000 |
| 11) | 25.8325 | 3.5000 | 22.76 | 1.808090 |
| 12) | −56.8121 | 0.9500 | | 1.000000 |
| 13) | −25.2334 | 0.9000 | 49.61 | 1.772500 |
| 14) | 500.0000 | D14 | | 1.000000 |
| 15> | Aperture Stop | 0.5000 | | 1.000000 |
| 16) | 24.4453 | 4.3000 | 82.52 | 1.497820 |
| 17) | −38.9608 | 0.1000 | | 1.000000 |
| 18) | 23.8212 | 2.0500 | 82.52 | 1.497820 |
| 19) | 46.3499 | 2.7000 | | 1.000000 |
| 20) | −24.7866 | 1.0000 | 23.78 | 1.846660 |
| 21) | −55.6820 | D21 | | 1.000000 |
| 22)* | 103.4624 | 3.5000 | 64.10 | 1.516800 |
| 23)* | −29.2538 | 0.0000 | | 1.000000 |
| 24) | Fixed Stop | 7.8500 | | 1.000000 |
| 25)* | −311.1355 | 0.2000 | 38.09 | 1.553890 |
| 26) | −100.0000 | 1.3000 | 46.58 | 1.804000 |
| 27) | 125.3392 | BF | | 1.000000 |

(Aspherical Data)

Surface Number 6

κ = 6.2788
C3 = −0.11851E-5
C4 = 1.41700E-6
C6 = −9.06140E-9
C8 = −8.32020E-11
C10 = 1.34880E-12
C12 = −0.38798E-14
Surface Number 22

κ = −99.9999

TABLE 1-continued (Specifications)
f: 29.1~192 mm
2ω: 74.1°~11.8°
FNO: 3.6~5.9

C3 = −0.23379E-5
C4 = −1.61500E-5
C6 = −2.10980E-7
C8 = 7.43050E-10
C10 = 1.73820E-11
Surface Number 23

κ = 2.1022
C3 = −0.35074E-5
C4 = −1.26210E-5
C6 = −5.83470E-8
C8 = −4.50420E-10
C10 = 2.23330E-11
C12 = −0.32891E-14
Surface Number 25

κ = 576.7229
C3 = −0.69399E-5
C4 = −3.82770E-5
C5 = 0.65412E-7
C6 = −5.66570E-9
C8 = −7.01160E-10
C10 = 3.79140E-12
C12 = 0.16919E-13

(Variable intervals upon zooming)

| | 1-POS | 2-POS | 3-POS |
|---|---|---|---|
| f | 29.1 | 50 | 192 |
| D0 | ∞ | ∞ | ∞ |
| D5 | 2.16928 | 9.21209 | 38.15808 |
| D14 | 19.14864 | 12.10583 | 0.80311 |
| D21 | 5.75080 | 3.31464 | 1.46943 |

| | 4-POS | 5-POS | 6-POS |
|---|---|---|---|
| β | −0.03333 | −0.03333 | −0.03333 |
| D0 | 825.2688 | 1429.7337 | 5065.4811 |
| D5 | 1.59450 | 8.75909 | 36.58228 |
| D14 | 19.72342 | 12.55883 | 2.37891 |
| D21 | 5.75080 | 3.31464 | 1.46943 |

| | 7-POS | 8-POS | 9-POS |
|---|---|---|---|
| β | −0.08067 | −0.13669 | −0.31493 |
| D0 | 314.9335 | 299.9877 | 259.2589 |
| D5 | 0.79962 | 7.41055 | 29.90142 |
| D14 | 20.51830 | 13.90737 | 9.05977 |
| D21 | 5.75080 | 3.31464 | 1.46943 |

(Values for the conditional expressions)

(1) Σdw/ft = 0.395
(2) f1/ft = 0.418
(3) |f2|/ft = 0.0768
(4) dpn/dm = 0.611
(5) f3/fm = 0.491
(6) np = 1.80809
(7) νp = 22.76

Figure 2:
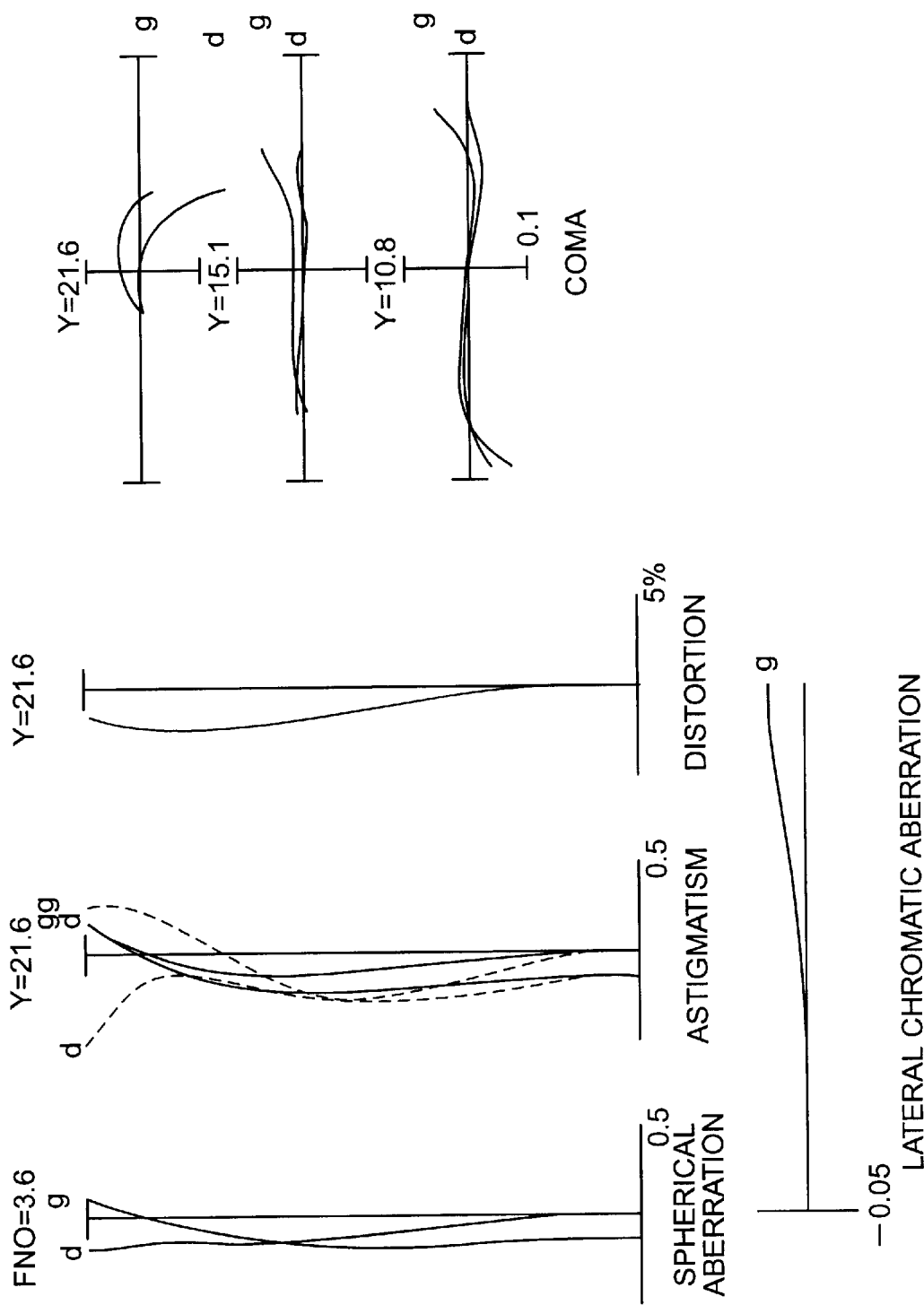
FIG. 2 graphically shows various aberrations of the zoom lens system according to Example 1 of the first embodiment in a wide-angle end state when the system is focused at infinity.
Figure 3:
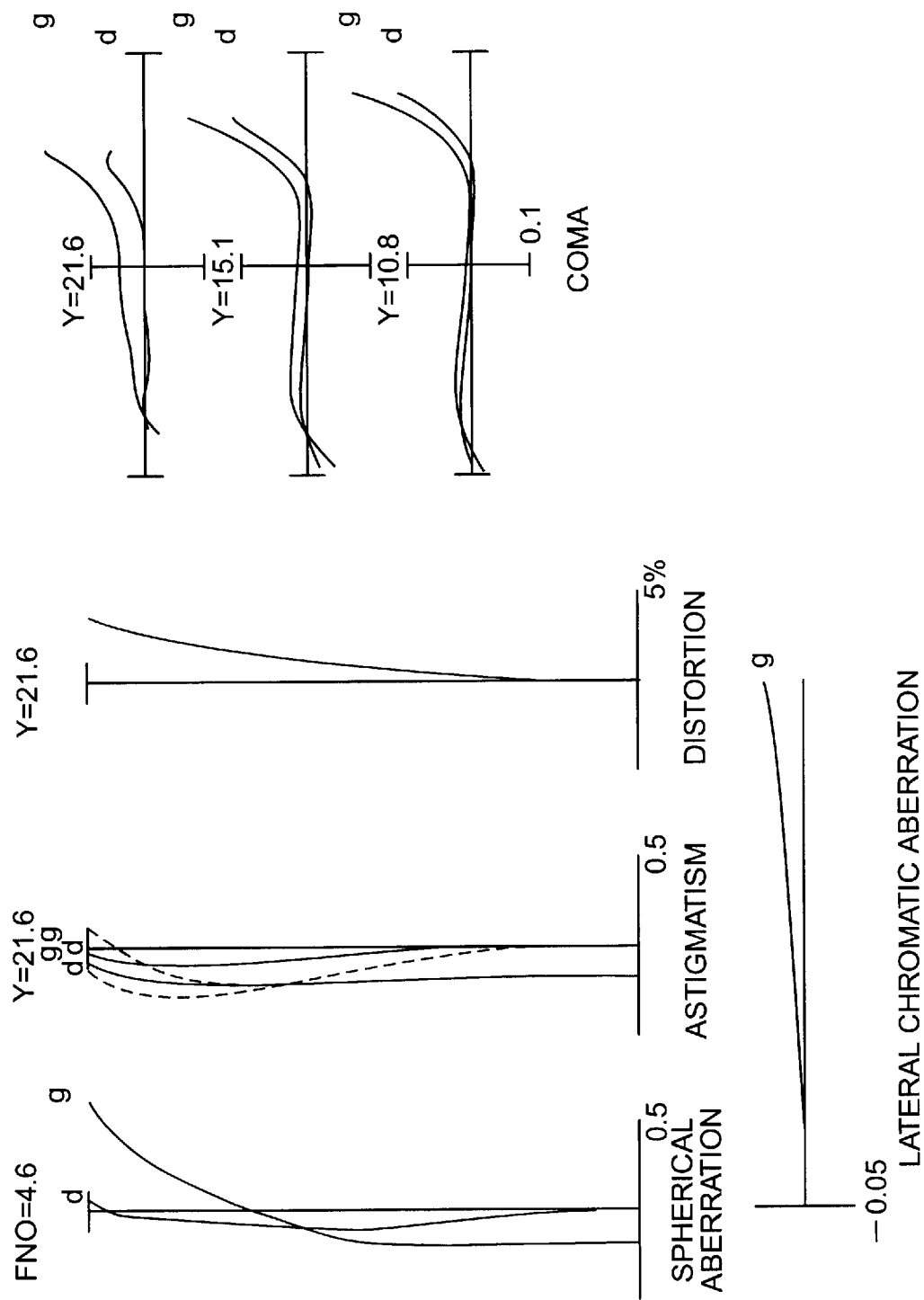
FIG. 3 graphically shows various aberrations of the zoom lens system according to Example 1 of the first embodiment in an intermediate focal length state when the system is focused at infinity.
Figure 4:
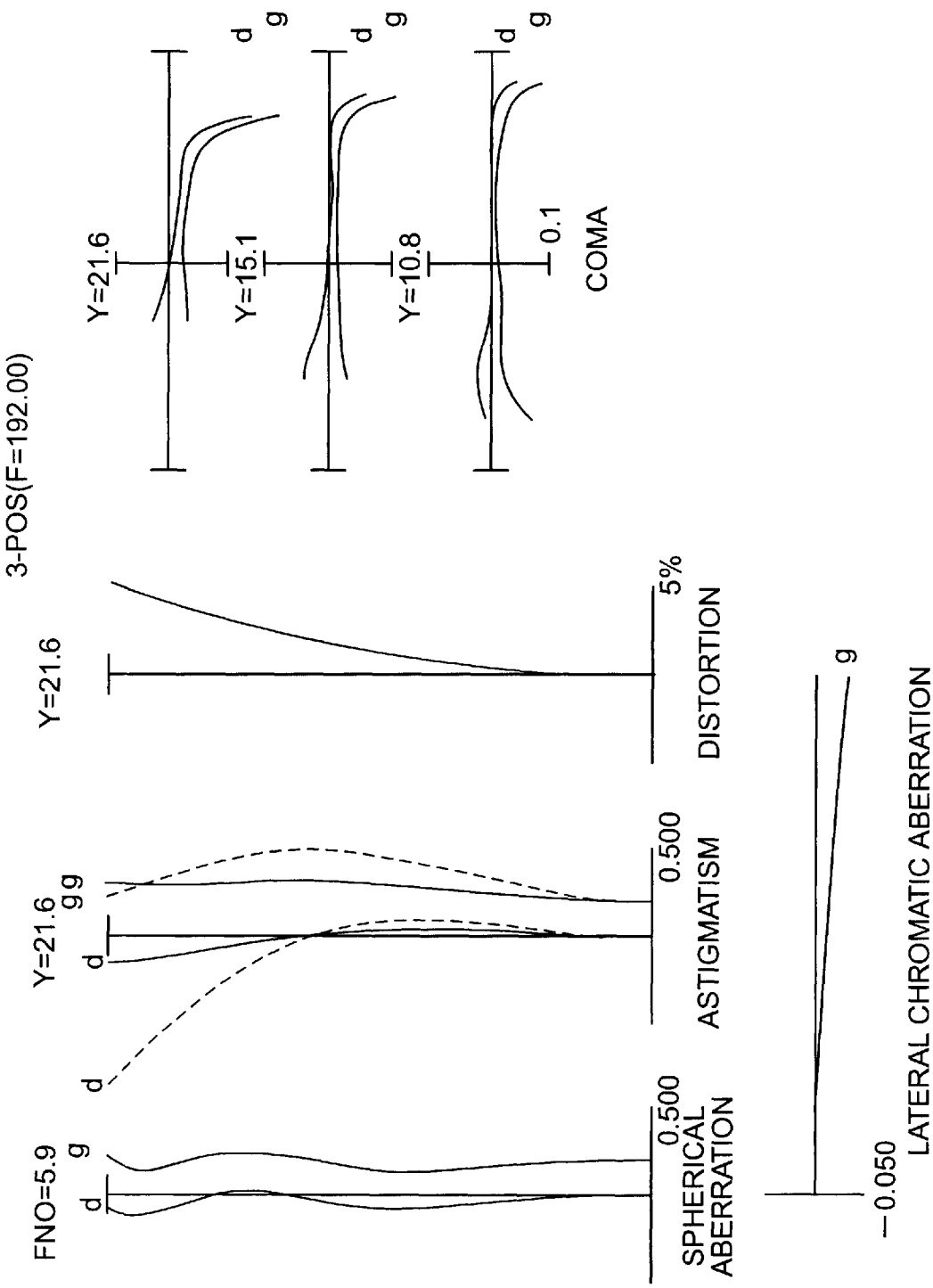
FIG. 4 graphically shows various aberrations of the zoom lens system according to Example 1 of the first embodiment in a telephoto end state when the system is focused at infinity.

FIGS. 2, 3, 4 graphically show various aberrations of the zoom lens system according to Example 1 of the first embodiment in a wide-angle end state, an intermediate focal length state, and a telephoto end state, respectively when the system is focused at infinity.

In respective graphs, FNO denotes the f-number, Y denotes an image height, and d, g denote aberration curves at d-line and g-line, respectively. In the graphs showing spherical aberration, the value of FNO is the f-number with respect to the maximum aperture. In the graphs showing astigmatism and distortion, the value of Y denotes the maximum image height. In the graphs showing coma, the value of Y denotes an image height for each image. In the graphs showing astigmatism, a solid line indicates a sagittal image plane, and a broken line indicates a meridional image plane. In all aberration graphs of the following examples, the same denotations are applied.

As is apparent from the respective graphs showing various aberrations, excellent compensation is made for various aberrations up to large angle of view in the wide-angle end state, in the intermediate focal length state, and in the telephoto end state.

EXAMPLE 2

Figure 5:
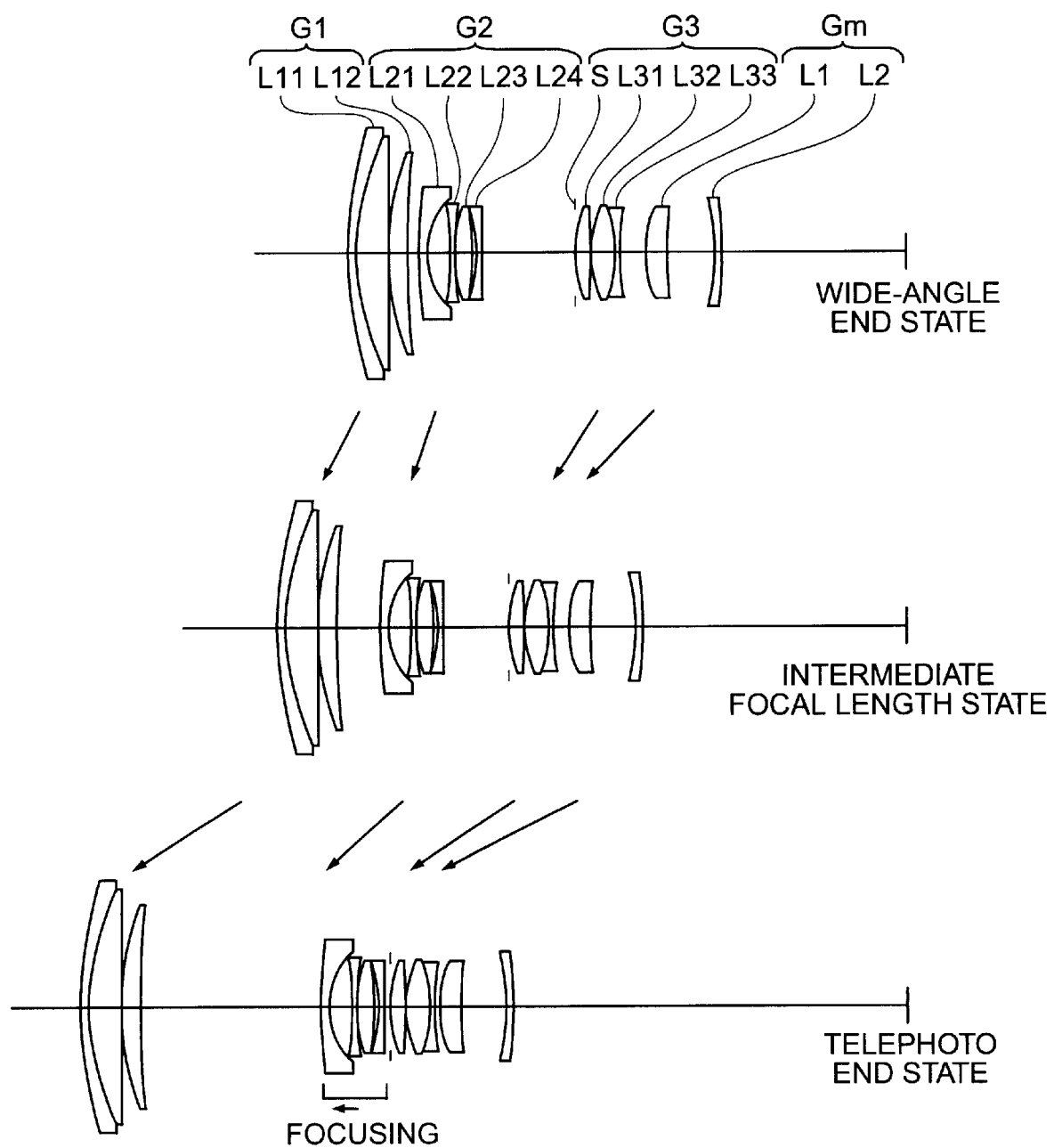
FIG. 5 is a diagram showing the lens arrangement of a zoom lens system according to Example 2 of the first embodiment of the present invention, together with the movement of each lens group during zooming.

FIG. 5 is a diagram showing the lens arrangement of a zoom lens system according to Example 2 of the first embodiment of the present invention, together with the movement of each lens group during zooming. A zoom lens system according to Example 2 of the first embodiment is composed of four lens groups having positive-negative-positive-positive arrangement. The zoom lens system consists of, in order from an object, a first lens group G1 having positive refractive power, a second lens group G2 having negative refractive power, a third lens group G3 having positive refractive power, and a fourth lens group Gm having positive refractive power.

The first lens group G1 consists of, in order from the object, a cemented positive lens L11 constructed by a negative meniscus lens having a convex surface facing to the object side cemented with a positive lens, and a positive meniscus lens L12 having a convex surface facing to the object side. The second lens group G2 consists of, in order from the object, a negative meniscus composite lens L21 composed of glass and resin materials having an aspherical surface facing to the object side, a double concave negative lens L22, a double convex positive lens L23, and a double concave negative lens L24. The third lens group G3 consists of, in order from the object, an aperture stop S, a double convex positive lens L31, a double convex positive lens L32, and a double concave negative lens L33. The fourth lens group Gm consists of, in order from the object, a positive lens L1 having an aspherical surface on both sides, and a negative lens L2 having an aspherical surface facing to the object side.

When the state of lens group positions is changed from a wide-angle end state to a telephoto end state, all lens groups are moved independently such that the space between the first lens group G1 and the second lens group G2 increases, the space between the second lens group G2 and the third lens group G3 decreases, and the space between the third lens group G3 and the fourth lens group Gm decreases. The focusing from the infinity to a closer object is carried out by moving the second lens group G2 to the object side.

Various values associated with Example 2 are listed in Table 2.

TABLE 2

(Specifications)
f: 29.1~192 mm
2ω: 75.72°~12.2°
FNO: 3.6~5.9

(Lens Data)

| | r | d | ν | n |
|---|---|---|---|---|
| 1) | 87.5279 | 1.8000 | 23.78 | 1.846660 |

TABLE 2-continued (Specifications)
f: 29.1~192 mm
2ω: 75.72°~12.2°
FNO: 3.6~5.9

| | | | | |
|---|---|---|---|---|
| 2) | 53.1253 | 6.5000 | 58.54 | 1.651600 |
| 3) | −5701.5805 | 0.1000 | | 1.000000 |
| 4) | 57.4865 | 4.0000 | 82.52 | 1.497820 |
| 5) | 226.2795 | D5 | | 1.000000 |
| 6)* | 234.4399 | 0.1000 | 38.09 | 1.553890 |
| 7) | 200.0000 | 1.6000 | 46.58 | 1.804000 |
| 8) | 15.4471 | 4.5000 | | 1.000000 |
| 9) | −41.8184 | 0.8000 | 46.58 | 1.804000 |
| 10) | 95.9284 | 0.2000 | | 1.000000 |
| 11) | 25.9036 | 3.8000 | 25.43 | 1.805180 |
| 12) | −34.9386 | 0.6000 | | 1.000000 |
| 13) | −24.6319 | 0.8000 | 46.58 | 1.804000 |
| 14) | 93.9444 | D14 | | 1.000000 |
| 15> | Aperture Stop | 0.5000 | | 1.000000 |
| 16) | 32.9805 | 2.8000 | 70.41 | 1.487490 |
| 17) | −96.6873 | 0.1000 | | 1.000000 |
| 18) | 22.2785 | 5.0000 | 65.47 | 1.603000 |
| 19) | −26.7618 | 0.3000 | | 1.000000 |
| 20) | −24.6754 | 0.8000 | 34.96 | 1.801000 |
| 21) | 62.9378 | D21 | | 1.000000 |
| 22)* | 36.7066 | 4.5000 | 64.10 | 1.516800 |
| 23)* | −126.1978 | 9.3824 | | 1.000000 |
| 24)* | −49.8973 | 1.6000 | 49.61 | 1.772500 |
| 25) | −74.7878 | BF | | 1.000000 |

(Aspherical Data)

Surface Number 6

κ = 1.0000
C4 = 1.74130E-6
C6 = −3.42140E-8
C8 = 3.14560E-10
C10 = −6.55690E-13

Surface Number 22

κ = 5.8537
C4 = 2.59170E-5
C6 = 2.64070E-7
C8 = 2.05700E-9
C10 = 1.98630E-11

Surface Number 23

κ = 141.6794
C4 = 6.12670E-5
C6 = 3.95820E-7
C8 = 5.44070E-10
C10 = 7.23820E-11

Surface Number 24

κ = 1.2657
C4 = −2.35230E-5
C6 = −5.14680E-8
C8 = −3.57100E-10
C10 = 3.87290E-12

(Variable intervals upon zooming)

| | 1-POS | 2-POS | 3-POS |
|---|---|---|---|
| f | 29.1 | 50 | 192 |
| D0 | ∞ | ∞ | ∞ |
| D5 | 2.33792 | 11.58687 | 38.76375 |
| D14 | 19.38779 | 12.74116 | 0.95866 |
| D21 | 5.25943 | 2.96326 | 0.99363 |

| | 4-POS | 5-POS | 6-POS |
|---|---|---|---|
| β | −0.03333 | −0.03333 | −0.03333 |
| D0 | 819.1429 | 1414.9776 | 5002.932 |
| D5 | 1.76314 | 11.08415 | 37.03206 |
| D14 | 19.96257 | 13.24388 | 2.69035 |
| D21 | 5.25943 | 2.96326 | 0.99363 |

TABLE 2-continued (Specifications)
f: 29.1~192 mm
2ω: 75.72°~12.2°
FNO: 3.6~5.9

| | 7-POS | 8-POS | 9-POS |
|---|---|---|---|
| β | −0.08146 | −0.13528 | −0.30970 |
| D0 | 305.3047 | 289.9969 | 251.0323 |
| D5 | 0.95506 | 9.61720 | 30.20712 |
| D14 | 20.77065 | 14.71083 | 9.51529 |
| D21 | 5.25943 | 2.96326 | 0.99363 |

(Values for the conditional expressions)

(1) Σdw/ft = 0.400
(2) f1/ft = 0.418
(3) |f2|/ft = 0.0768
(4) dpn/dm = 0.606
(5) f3/fm = 0.491
(6) np = 1.80518
(7) νp = 25.43

Figure 6:
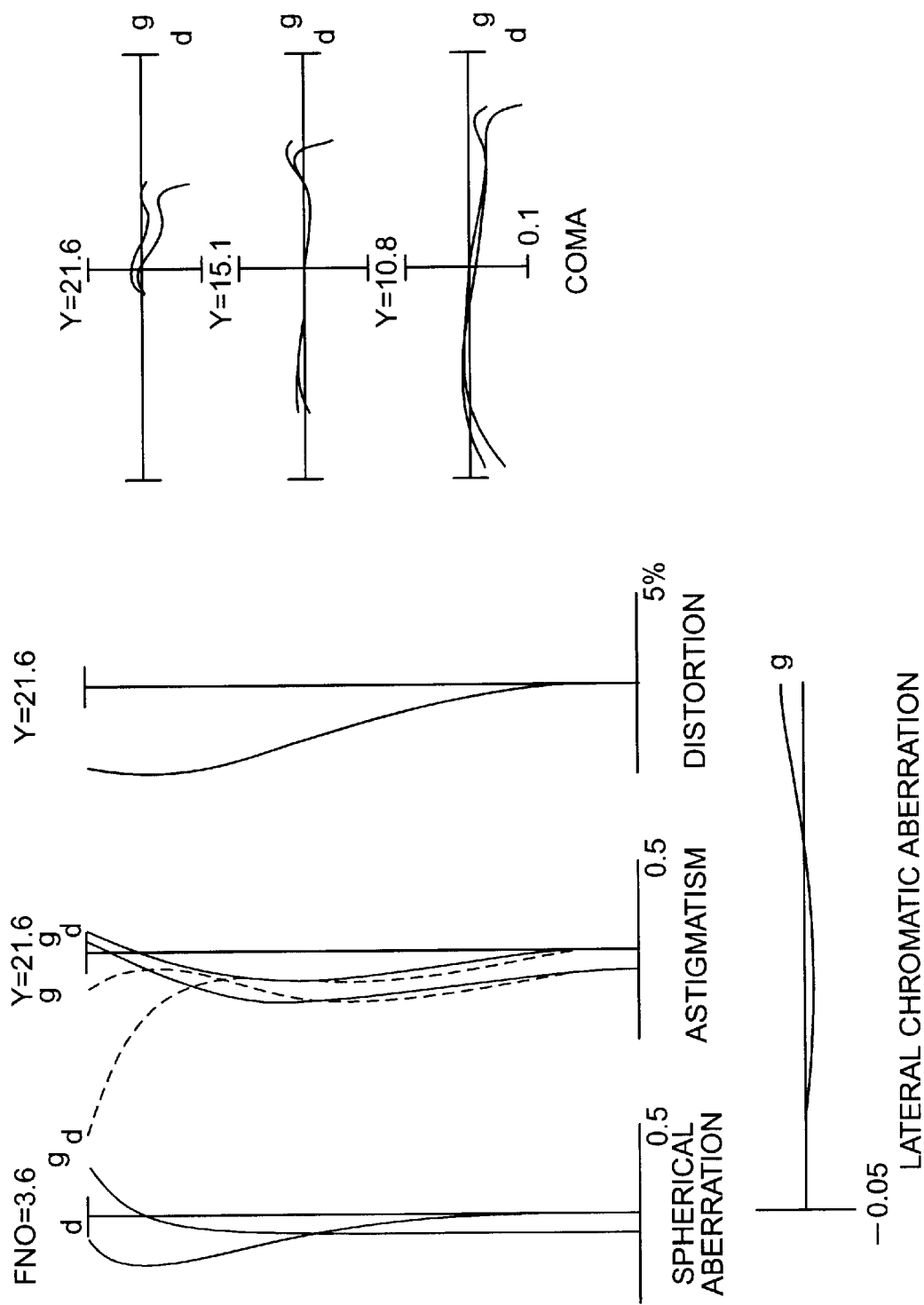
FIG. 6 graphically shows various aberrations of the zoom lens system according to Example 2 of the first embodiment in a wide-angle end state when the system is focused at infinity.
Figure 7:
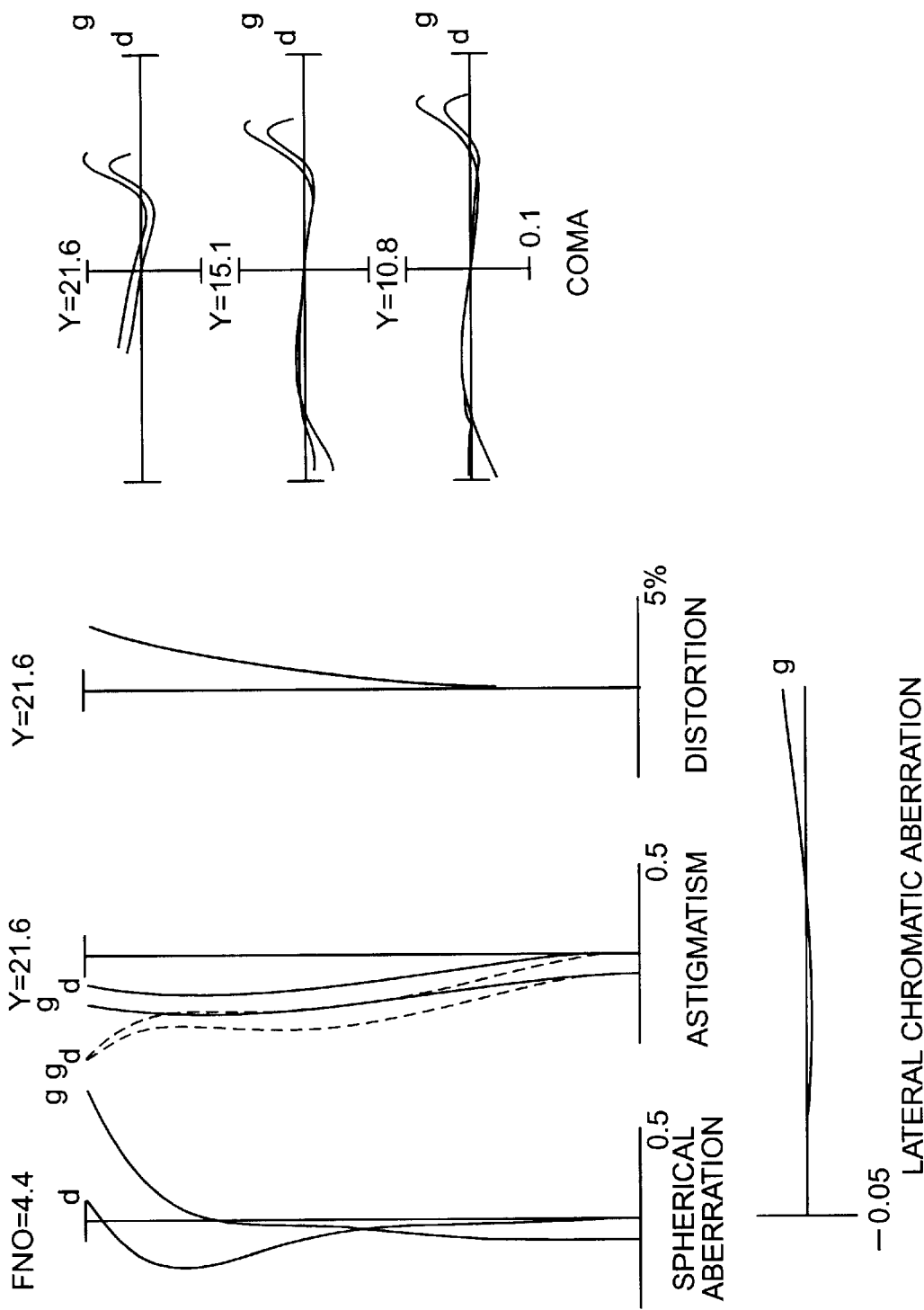
FIG. 7 graphically shows various aberrations of the zoom lens system according to Example 2 of the first embodiment in an intermediate focal length state when the system is focused at infinity.
Figure 8:
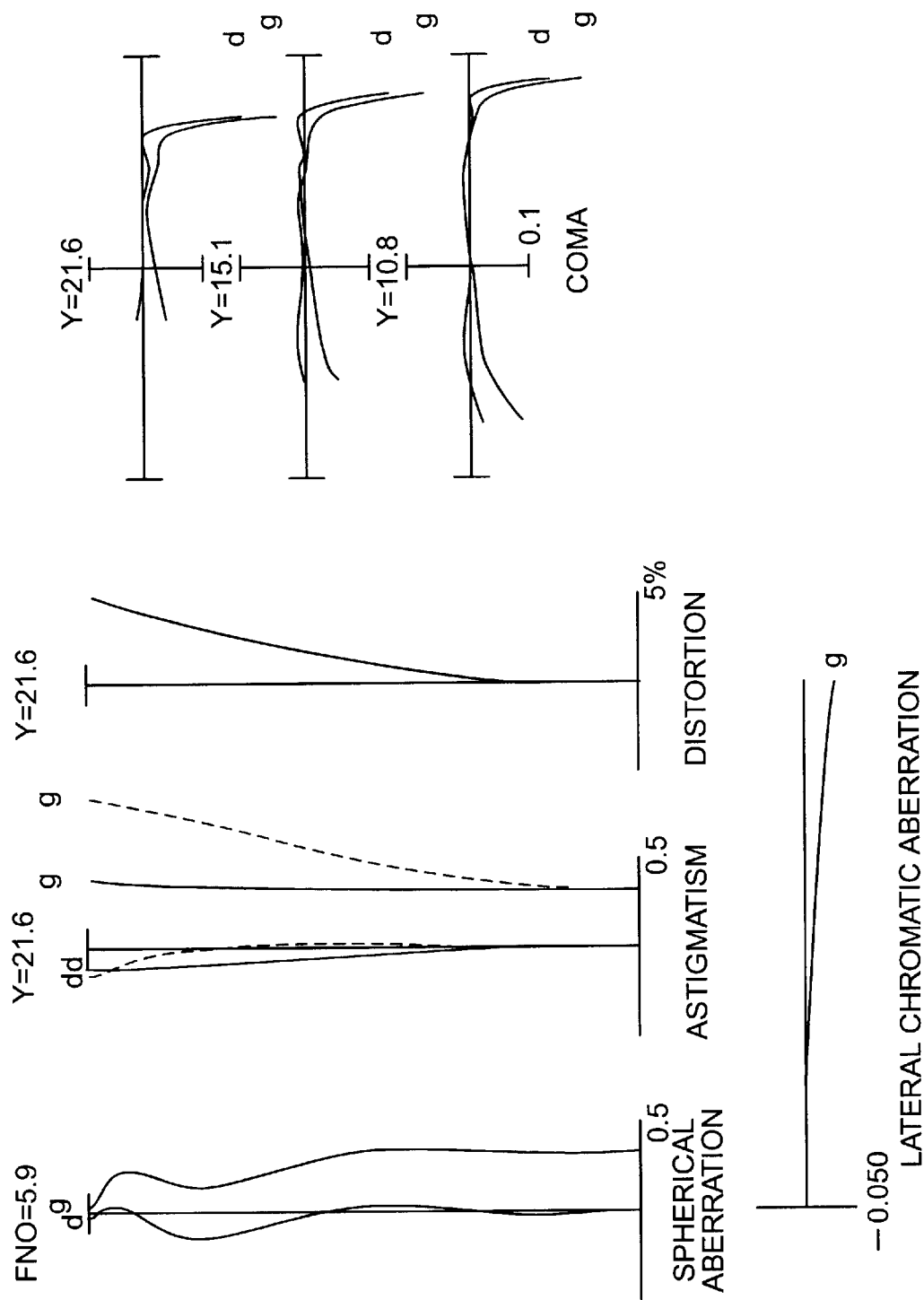
FIG. 8 graphically shows various aberrations of the zoom lens system according to Example 2 of the first embodiment in a telephoto end state when the system is focused at infinity.

FIGS. 6, 7, 8 graphically show various aberrations of the zoom lens system according to Example 2 of the first embodiment in a wide-angle end state, an intermediate focal length state, and a telephoto end state, respectively when the system is focused at infinity.

As is apparent from the respective graphs showing various aberrations, excellent compensation is made for various aberrations up to large angle of view in the wide-angle end state, in the intermediate focal length state, and in the telephoto end state.

EXAMPLE 3

Figure 9:
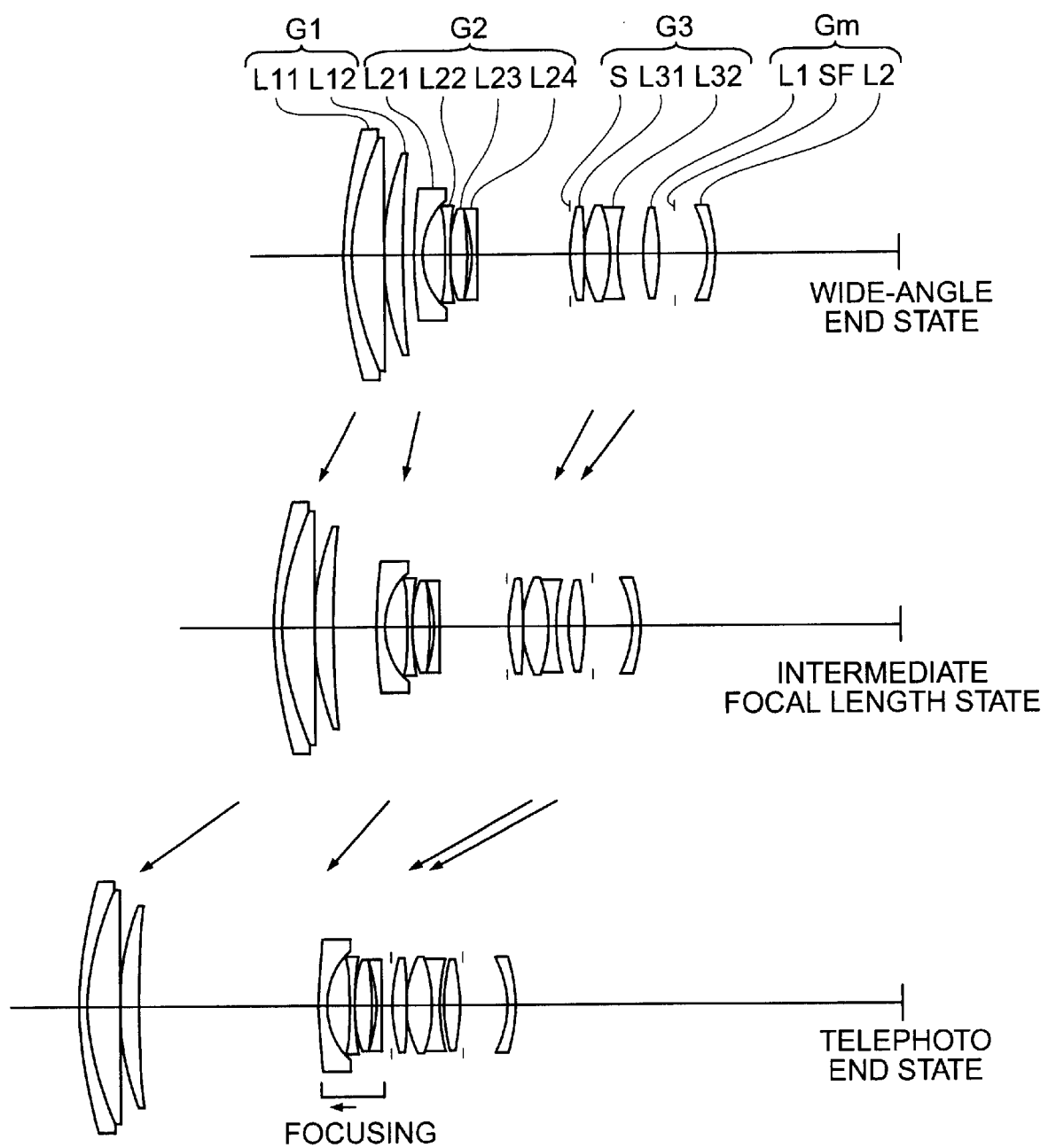
FIG. 9 is a diagram showing the lens arrangement of a zoom lens system according to Example 3 of the first embodiment of the present invention, together with the movement of each lens group during zooming.

FIG. 9 is a diagram showing the lens arrangement of a zoom lens system according to Example 3 of the first embodiment of the present invention, together with the movement of each lens group during zooming. A zoom lens system according to Example 3 of the first embodiment is composed of four lens groups having positive-negative-positive-positive arrangement. The zoom lens system consists of, in order from an object, a first lens group G1 having positive refractive power, a second lens group G2 having negative refractive power, a third lens group G3 having positive refractive power, and a fourth lens group Gm having positive refractive power.

The first lens group G1 consists of, in order from the object, a cemented positive lens L11 constructed by a negative meniscus lens having a convex surface facing to the object side cemented with a positive lens, and a positive meniscus lens L12 having a convex surface facing to the object side. The second lens group G2 consists of, in order from the object, a negative meniscus composite lens L21 composed of glass and resin materials having an aspherical surface facing to the object side, a double concave negative lens L22, a double convex positive lens L23, and a double concave negative lens L24. The third lens group G3 consists of, in order from the object, an aperture stop S, a double convex positive lens L31, and a cemented positive lens L32 constructed by a double convex positive lens cemented with a double concave negative lens. The fourth lens group Gm consists of, in order from the object, a double convex positive lens L1 having aspherical surfaces on both sides, and a negative lens L2 having an aspherical surface facing to the object side.

When the state of lens group positions is changed from a wide-angle end state to a telephoto end state, all lens groups are moved independently such that the space between the first lens group G1 and the second lens group G2 increases, the space between the second lens group G2 and the third lens group G3 decreases, and the space between the third lens group G3 and the fourth lens group Gm decreases. The focusing from the infinity to a closer object is carried out by moving the second lens group G2 to the object side.

Various values associated with Example 3 are listed in Table 3.

TABLE 3

(Specifications)
f: 29.1~192 mm
2ω: 75.98°~12.21°
FNO: 3.6~5.9

(Lens Data)

| | r | d | ν | n |
|---|---|---|---|---|
| 1) | 76.7545 | 1.8000 | 23.78 | 1.846660 |
| 2) | 48.6074 | 6.4000 | 58.54 | 1.651600 |
| 3) | 1026.1021 | 0.1000 | | 1.000000 |
| 4) | 59.9580 | 3.8000 | 82.52 | 1.497820 |
| 5) | 235.0890 | D5 | | 1.000000 |
| 6)* | 128.8373 | 0.0500 | 38.09 | 1.553890 |
| 7) | 120.0000 | 1.6000 | 42.72 | 1.834810 |
| 8) | 15.2404 | 4.6000 | | 1.000000 |
| 9) | −41.5181 | 0.8000 | 52.67 | 1.741000 |
| 10) | 55.7590 | 0.1000 | | 1.000000 |
| 11) | 27.4299 | 3.2000 | 23.78 | 1.846660 |
| 12) | −57.7463 | 1.0000 | | 1.000000 |
| 13) | −26.3624 | 0.8000 | 49.61 | 1.772500 |
| 14) | 6663.8990 | D14 | | 1.000000 |
| 15> | Aperture Stop | 0.5000 | | 1.000000 |
| 16) | 30.7236 | 3.0000 | 64.10 | 1.516800 |
| 17) | −90.0392 | 0.1000 | | 1.000000 |
| 18) | 22.8071 | 5.2000 | 65.47 | 1.603000 |
| 19) | −23.2674 | 1.5000 | 37.17 | 1.834000 |
| 20) | 56.1488 | D20 | | 1.000000 |
| 21)* | 45.7569 | 3.0000 | 64.10 | 1.516800 |
| 22)* | −55.8518 | 3.0000 | | 1.000000 |
| 23) | Fixed Stop | 7.0401 | | 1.000000 |
| 24) | −21.0825 | 1.6000 | 42.24 | 1.799520 |
| 25) | −27.3149 | BF | | 1.000000 |

(Aspherical Data)

Surface Number 6

κ = 1.0000
C4 = 1.08270E-6
C6 = −3.32900E-8
C8 = 2.73850E-10
C10 = −6.80120E-13

Surface Number 21

κ = −0.3603
C4 = −7.05470E-7
C6 = 2.38510E-8
C8 = −3.20800E-12
C10 = −7.27680E-12

Surface Number 22

κ = 1.0000
C4 = −3.71520E-6
C6 = −5.71920E-8
C8 = −3.30780E-10
C10 = −5.13670E-12

Surface Number 24

κ = 1.2657
C4 = −2.93730E-5
C6 = −1.08010E-7
C8 = −1.18720E-9
C10 = −1.08530E-12

TABLE 3-continued (Specifications)
f: 29.1~192 mm
2ω: 75.98°~12.21°
FNO: 3.6~5.9

(Variable intervals upon zooming)

| | 1-POS | 2-POS | 3-POS |
|---|---|---|---|
| f | 29.1 | 50 | 192 |
| D0 | ∞ | ∞ | ∞ |
| D5 | 2.17796 | 11.42691 | 38.60379 |
| D14 | 19.49011 | 12.84348 | 1.06098 |
| D20 | 5.27034 | 2.97417 | 1.00454 |
| | 4-POS | 5-POS | 6-POS |
| β | −0.03333 | −0.03333 | −0.03333 |
| D0 | 819.1429 | 1414.9776 | 5002.932 |
| D5 | 1.60318 | 10.92419 | 36.87210 |
| D14 | 20.06489 | 13.34620 | 2.79267 |
| D20 | 5.27034 | 2.97417 | 1.00454 |
| | 7-POS | 8-POS | 9-POS |
| β | −0.08146 | −0.13528 | −0.30970 |
| D0 | 305.3047 | 289.9969 | 251.0323 |
| D5 | 0.79510 | 9.45724 | 30.04716 |
| D14 | 20.87297 | 14.81315 | 9.61761 |
| D20 | 5.27034 | 2.97417 | 1.00454 |

(Values for the conditional expressions)

(1) Σdw/ft = 0.397
(2) f1/ft = 0.418
(3) |f2|/ft = 0.0768
(4) dpn/dm = 0.686
(5) f3/fm = 0.491
(6) np = 1.84666
(7) vp = 23.78

Figure 10:
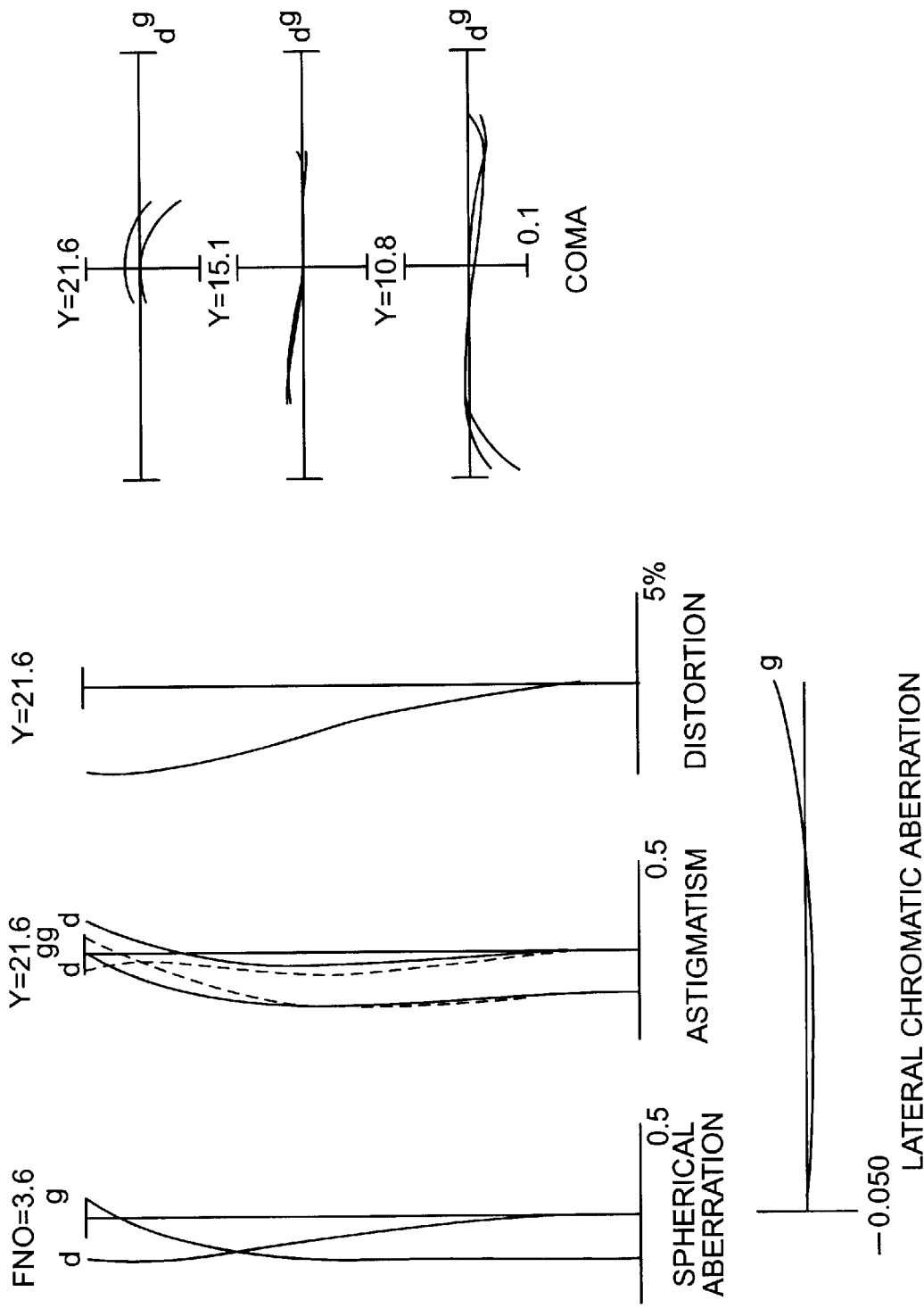
FIG. 10 graphically shows various aberrations of the zoom lens system according to Example 3 of the first embodiment in a wide-angle end state when the system is focused at infinity.
Figure 11:
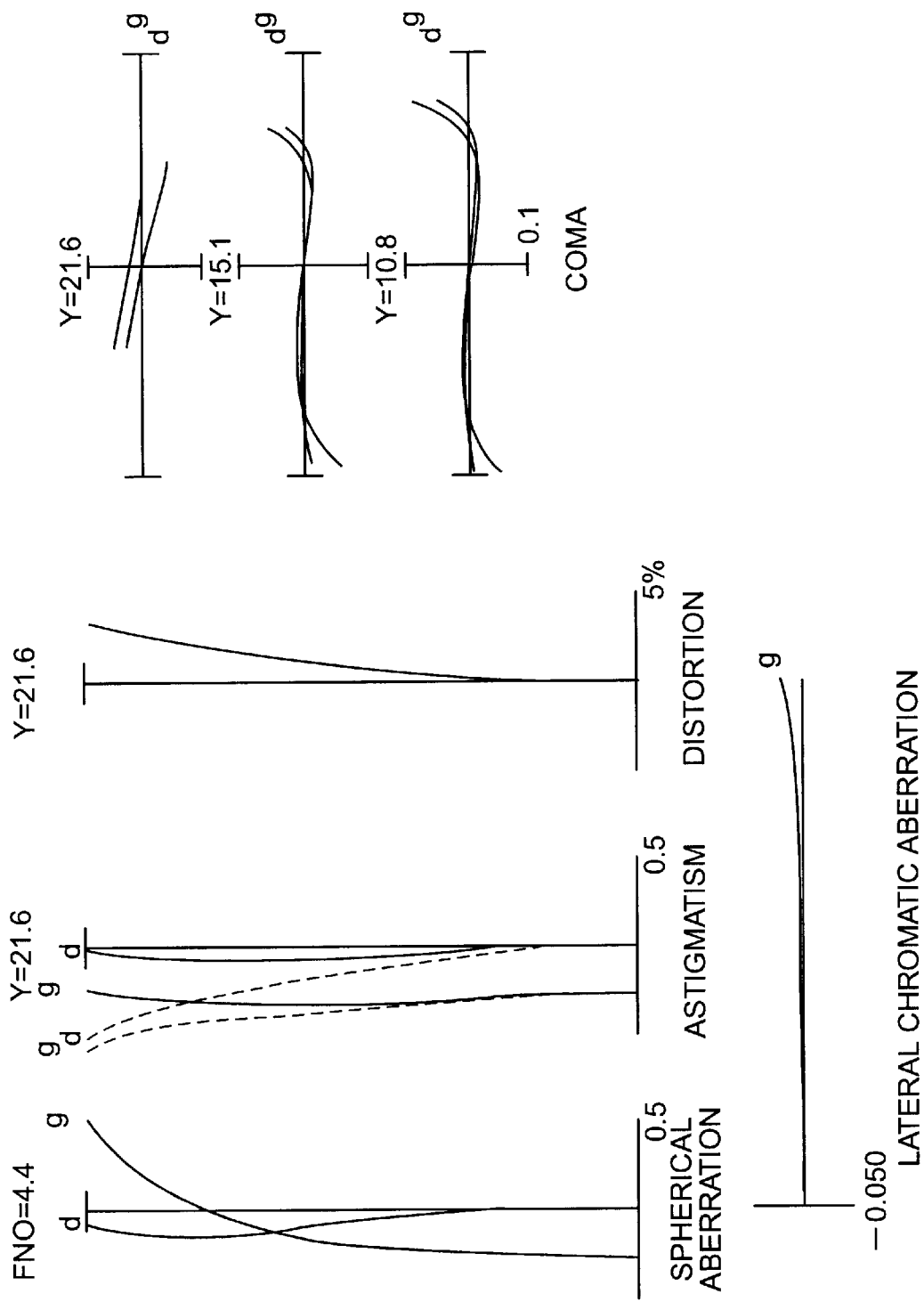
FIG. 11 graphically shows various aberrations of the zoom lens system according to Example 3 of the first embodiment in an intermediate focal length state when the system is focused at infinity.
Figure 12:
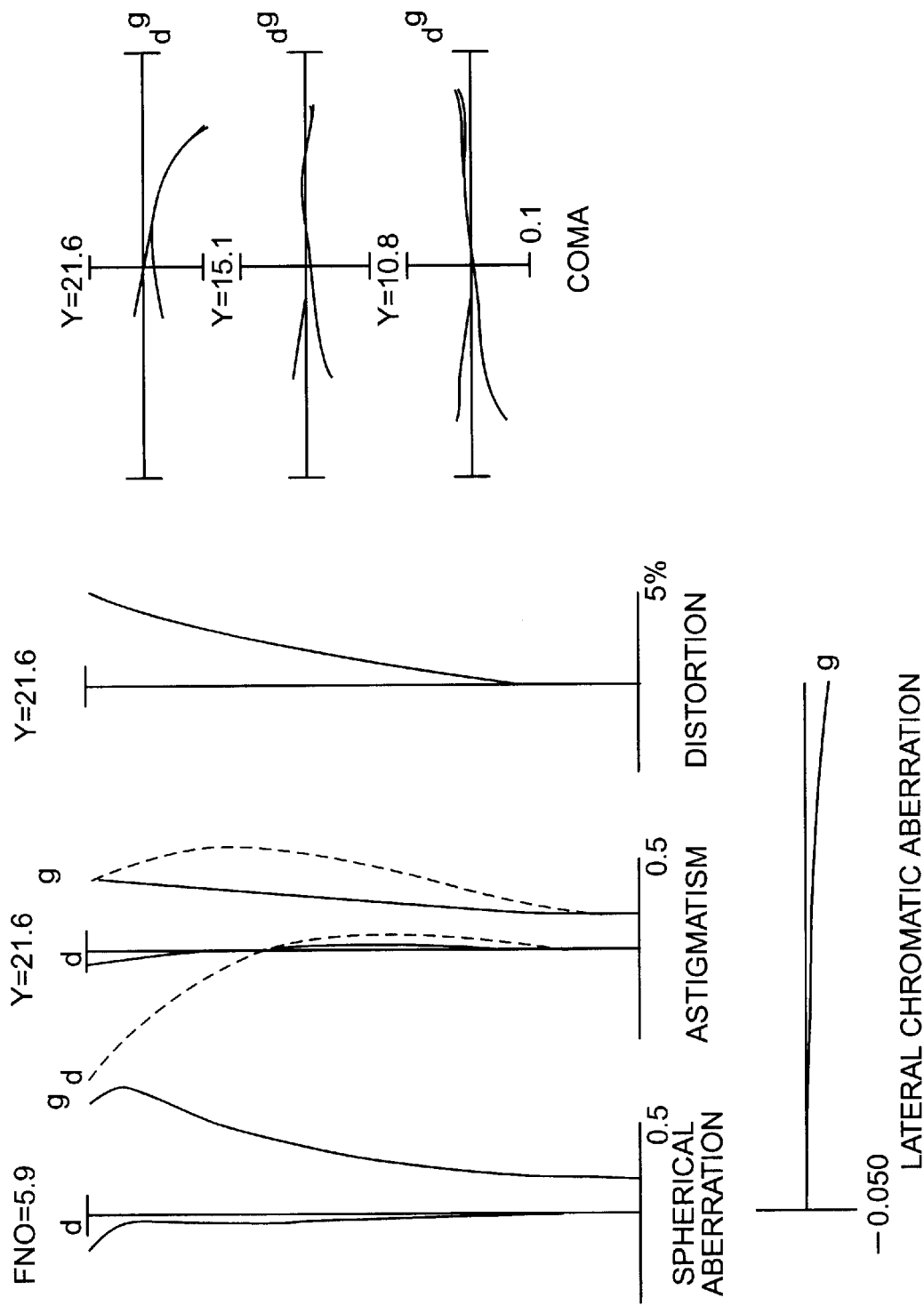
FIG. 12 graphically shows various aberrations of the zoom lens system according to Example 3 of the first embodiment in a telephoto end state when the system is focused at infinity.

FIGS. 10, 11, 12 graphically show various aberrations of the zoom lens system according to Example 3 of the first embodiment in a wide-angle end state, an intermediate focal length state, and a telephoto end state, respectively when the system is focused at infinity.

As is apparent from the respective graphs showing various aberrations, excellent compensation is made for various aberrations up to large angle of view in the wide-angle end state, in the intermediate focal length state, and in the telephoto end state.

(Second Embodiment)

It is particularly important for the second embodiment of the present invention that a rear lens group (master lens group), which is the rear lens group of a positive-lens-leading zoom lens represented typically by four unit zoom lenses having positive-negative-positive-positive arrangement, consists of the minimum number of lens elements for correcting chromatic aberration and other aberrations. This construction is a basic construction of a telephoto type. The construction of the embodiment is essential condition to make the rear (master) lens group extremely thinner and to make the back focal length shorter. This construction makes it possible to realize minimizing the size of the filter, the diameter of the lens system, and the total lens length.

The characteristics of the second embodiment of the present invention will be explained below in accordance with each conditional expression.

Conditional expression (8) defines the total lens length, excluding the back focal length from the optical lens length, of the zoom lens system normalized by the focal length of the zoom lens system in a telephoto end state.

When the ratio Σdw/ft exceeds the upper limit of conditional expression (8), the total lens length of the zoom lens system becomes too thick. As a result, the compactness that is the purpose of the present invention cannot be accomplished by the lens construction according to the present invention. Moreover, the weight including the lens barrel becomes heavier and the cost of the material also increases, so that it becomes unattractive as a common, high-zoom-ratio zoom lens.

When the upper limit of conditional expression (8) is set to be less than 0.53, a common, high-zoom-ratio zoom lens can be realized with lower manufacturing cost. Moreover, when the upper limit of conditional expression (8) is set to be less than 0.50, the maximum optical performance of the present invention can be expected.

On the other hand, when the ratio falls below the lower limit of conditional expression (8), the total lens length of the zoom lens system becomes extremely narrow. As a result, the back focal length becomes short, so that the zoom lens system cannot be virtually used as an interchangeable lens of a single lens reflex camera. Since each lens group is necessary to have extremely strong power, correction of aberration becomes difficult. As a result, it becomes impossible to make the zoom ratio high, so that it is undesirable.

When the lower limit of conditional expression (8) is set to be more than 0.20, the maximum optical performance of the present invention can be expected.

Conditional expression (9) defines the focal length of the first lens group normalized by that of the zoom lens system in the telephoto end state. To optimize the focal length of the first lens group is important condition for realizing a good aberration correction and for settling the length of the zoom lens system.

When the ratio f1/ft exceeds the upper limit of conditional expression (9), it means the power of the first lens group becomes weak, so that the total lens length of the zoom lens system becomes large. This is undesirable.

Moreover, in a high-zoom-ratio zoom lens system like the present invention, the total lens length varies drastically in the telephoto state, so that it becomes difficult to carve a curve for a cam on a lens barrel.

In the case with extremely fewer lens elements like the present invention, it becomes more important to set optimum Petzval summation. When the power of the first lens group is decreased, Petzval summation becomes smaller, so that it becomes difficult to correct curvature of field and astigmatism. This is undesirable.

When the upper limit of conditional expression (9) is set to be less than 0.55, it becomes possible to set better Petzval summation. Moreover, when the upper limit of conditional expression (9) is set to be less than 0.48, the maximum optical performance of the present invention can be expected.

On the other hand, when the ratio falls below the lower limit of conditional expression (9), refractive power of the first lens group becomes extremely large. The increase of refractive power of the first lens group has the effect that the light ray entered to the front lens at large angle of view is further lowered to the periphery of the lens. Therefore, light quantity in the periphery of the field decreases. As a result, the diameter of the front lens and that of the filter become large, so that it is undesirable. Moreover, in the correction of aberration, peripheral coma in the wide-angle end state and spherical aberration in the telephoto end state become worse, so that it is undesirable.

When the lower limit of conditional expression (9) is set to be more than 0.30, the maximum optical performance of the present invention can be expected.

In order to exhibit the maximum optical performance of the present invention, it is desirable that an aspherical surface is arranged in positive lens component L1 of the lens group Gm having a convex surface facing to the object side. The aspherical surface has a shape that the curvature becomes small as the height goes from the optical axis to the periphery of the surface. This is for using the lens group Gm, which is the master lens group, as a fast optical system sufficiently corrected spherical aberration with fewer numbers of lens elements.

Moreover, in a preferred embodiment of the present invention, it is desirable that the positive lens component L1 of the lens group Gm having a convex surface facing to the object side has aspherical surfaces on both object side and image side. The aspherical surface on the object side has a shape that the curvature becomes large as the height goes from the optical axis to the periphery of the surface. The aspherical surface on the image side has a shape that the curvature becomes small as the height goes from the optical axis to the periphery of the surface. As described above, this is for correcting spherical aberration of the lens group Gm itself well and for enhancing the effect to correct various off-axis aberrations. Because both aspherical surfaces are separated with each other by the thickness of the lens, the each aspherical surface has different height and angle of deviation with respect to each incident ray. By using the different height and angle of deviation for designing each aspherical surface, a plurality of aberrations can be corrected at the same time.

Furthermore, in a preferred embodiment of the present invention, it is desirable that the following conditional expression (10) is satisfied:

$$0.10 < nb-na \qquad (10)$$

where na denotes refractive index of the positive lens element La in the negative lens component L2 at d-line ($\lambda$=587.56 nm) and nb denotes that of the negative lens element Lb in the negative lens component L2 at d-line.

Conditional expression (10) defines the difference in refractive index between the positive lens element La and the negative lens element Lb in the negative lens component L2.

When the difference falls below the lower limit of conditional expression (10), Petzval summation becomes smaller than an appropriate value and, as a result, curvature of field and astigmatism become difficult to correct, so that it is undesirable.

In a preferred embodiment of the present invention, it is desirable that the positive lens element La and the negative lens element Lb in the negative lens component L2 are a cemented negative lens. In this case, the number of lens parts becomes two. As a result, the mechanical structure of the lens barrel becomes simple, so that stability of manufacturing improves. Moreover, it becomes effective for correcting Petzval summation, off-axis aberrations as well as spherical aberration.

EXAMPLE 4

Figure 13:
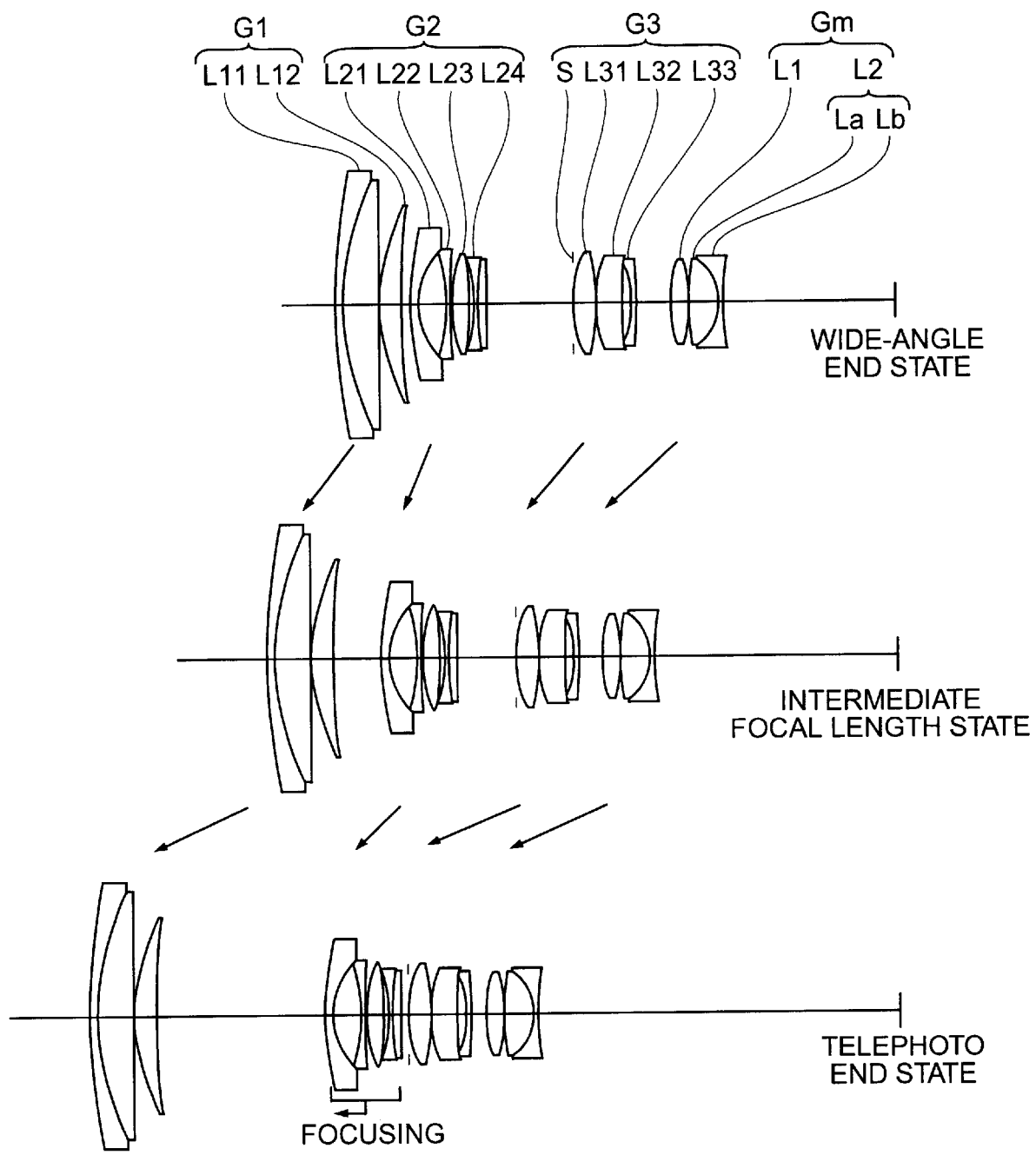
FIG. 13 is a diagram showing the lens arrangement of a zoom lens system according to Example 4 of a second embodiment of the present invention, together with the movement of each lens group during zooming.

FIG. 13 is a diagram showing the lens arrangement of a zoom lens system according to Example 4 of a second embodiment of the present invention, together with the movement of each lens group during zooming. A zoom lens system according to Example 4 of the second embodiment is composed of four lens groups having positive-negative-positive-positive arrangement. The zoom lens system consists of, in order from an object, a first lens group G1 having positive refractive power, a second lens group G2 having negative refractive power, a third lens group G3 having positive refractive power, and a fourth lens group Gm having positive refractive power.

The first lens group G1 consists of, in order from the object, a cemented positive lens L11 constructed by a negative meniscus lens having a convex surface facing to the object side cemented with a double convex positive lens, and a positive meniscus lens L12 having a convex surface facing to the object side.

The second lens group G2 consists of, in order from the object, a negative meniscus composite lens L21 composed of glass and resin materials having an aspherical surface facing to the object side, a double concave negative lens L22, a double convex positive lens L23, and a cemented lens L24 constructed by a double concave negative lens cemented with a double convex positive lens.

The third lens group G3 consists of, in order from the object, an aperture stop S, a double convex positive lens L31, a positive meniscus lens L32, and a negative meniscus lens L33 having a concave surface facing to the object side.

The fourth lens group Gm consists of, in order from the object, a double convex positive lens L1 having aspherical surfaces on both sides, and a cemented negative lens L2 constructed by a positive lens element La cemented with a negative lens element Lb.

When the state of lens group positions is changed from a wide-angle end state to a telephoto end state, all lens groups are moved independently such that the space between the first lens group G1 and the second lens group G2 increases, the space between the second lens group G2 and the third lens group G3 decreases, and the space between the third lens group G3 and the fourth lens group Gm decreases. The focusing from the infinity to a closer object is carried out by moving the second lens group G2 to the object side.

Various values associated with Example 4 are listed in Table 4.

TABLE 4

(Specifications)
f: 29.1~192 mm
2ω: 74.8°~12.35°
FNO: 3.58~5.93

(Lens Data)

| | r | d | ν | n |
|---|---|---|---|---|
| 1) | 150.7807 | 1.8000 | 27.51 | 1.755200 |
| 2) | 56.5651 | 8.6000 | 60.29 | 1.620410 |
| 3) | −558.1296 | 0.1000 | | 1.000000 |
| 4) | 49.8248 | 4.6000 | 65.47 | 1.603000 |
| 5) | 180.7695 | D5 | | 1.000000 |
| 6)* | 90.6745 | 0.0500 | 38.09 | 1.553890 |
| 7) | 80.0000 | 1.6000 | 46.58 | 1.804000 |
| 8) | 15.8095 | 6.0000 | | 1.000000 |
| 9) | −33.8237 | 0.8000 | 52.67 | 1.741000 |
| 10) | 107.1131 | 0.5000 | | 1.000000 |
| 11) | 35.0391 | 3.7000 | 25.43 | 1.805180 |
| 12) | −56.1604 | 1.2000 | | 1.000000 |
| 13) | −24.7700 | 0.800 | 52.67 | 1.741000 |
| 14) | 71.9627 | 1.7000 | 27.51 | 1.755200 |
| 15) | −661.1088 | D15 | | 1.000000 |
| 16> | Aperture Stop | 0.5000 | | 1.000000 |
| 17) | 25.5600 | 5.0000 | 82.52 | 1.497820. |
| 18) | −46.6735 | 0.1000 | | 1.000000 |
| 19) | 28.4617 | 5.5670 | 60.29 | 1.620410 |
| 20) | 104.3588 | 1.8000 | | 1.000000 |
| 21) | −26.9051 | 1.0000 | 25.43 | 1.805180 |
| 22) | −157.7424 | D22 | | 1.000000 |

TABLE 4-continued (Specifications)
f: 29.1~192 mm
2ω: 74.8°~12.35°
FNO: 3.58~5.93

| 23)* | 38.4500 | 4.1000 | 64.10 | 1.516800 |
|---|---|---|---|---|
| 24)* | −22.3486 | 0.1000 | | 1.000000 |
| 25) | 238.7950 | 6.5606 | 38.02 | 1.603420 |
| 26) | −10.7149 | 1.0000 | 42.24 | 1.799520 |
| 27) | 66.1881 | BF | | 1.000000 |

(Aspherical Data)

Surface Number 6

κ = −99.9999
C3 = −0.61646E-5
C4 = 2.01760E-5
C5 = 0.57708E-6
C6 = −1.60890E-7
C8 = 7.27630E-10
C10 = −2.11670E-12
C12 = 0.28307E-14

Surface Number 23

κ = 8.8167
C3 = 0.11304E-5
C4 = −1.98750E-5
C6 = 2.70560E-7
C8 = −2.13350E-9
C10 = 2.55000E-11

Surface Number 24

κ = −0.3981
C3 = 0.00000
C4 = 1.29810E-6
C6 = 2.40440E-7
C8 = −2.15810E-9
C10 = 2.02660E-11

(Variable intervals upon zooming)

| | 1-POS | 2-POS | 3-POS |
|---|---|---|---|
| f | 29.1 | 50. | 192. |
| D0 | ∞ | ∞ | ∞ |
| D5: | 2.19536 | 11.73635 | 38.64507 |
| D15: | 19.34330 | 12.75379 | 0.90567 |
| D22: | 7.92816 | 5.83106 | 3.76735 |

| | 4-POS | 5-POS | 6-POS |
|---|---|---|---|
| β | −0.03333 | −0.03333 | −0.03333 |
| D0 | 823.1093 | 1417.7163 | 5003.6169 |
| D5: | 1.62057 | 11.22642 | 36.90420 |
| D15: | 19.91809 | 13.26372 | 2.64654 |
| D22: | 7.92816 | 5.83106 | 3.76735 |

| | 7-POS | 8-POS | 9-POS |
|---|---|---|---|
| β | −0.09033 | −0.14925 | −0.33513 |
| D0 | 274.5556 | 259.0213 | 220.2366 |
| D5: | 0.66625 | 9.54400 | 29.63158 |
| D15: | 20.87241 | 14.94614 | 9.91916 |
| D22: | 7.92816 | 5.83106 | 3.76735 |

(Values for the conditional expressions)

(8): Σdw/ft = 0.451
(9): f1/ft = 0.418
(10): nb − na = 0.1961

Figure 14:
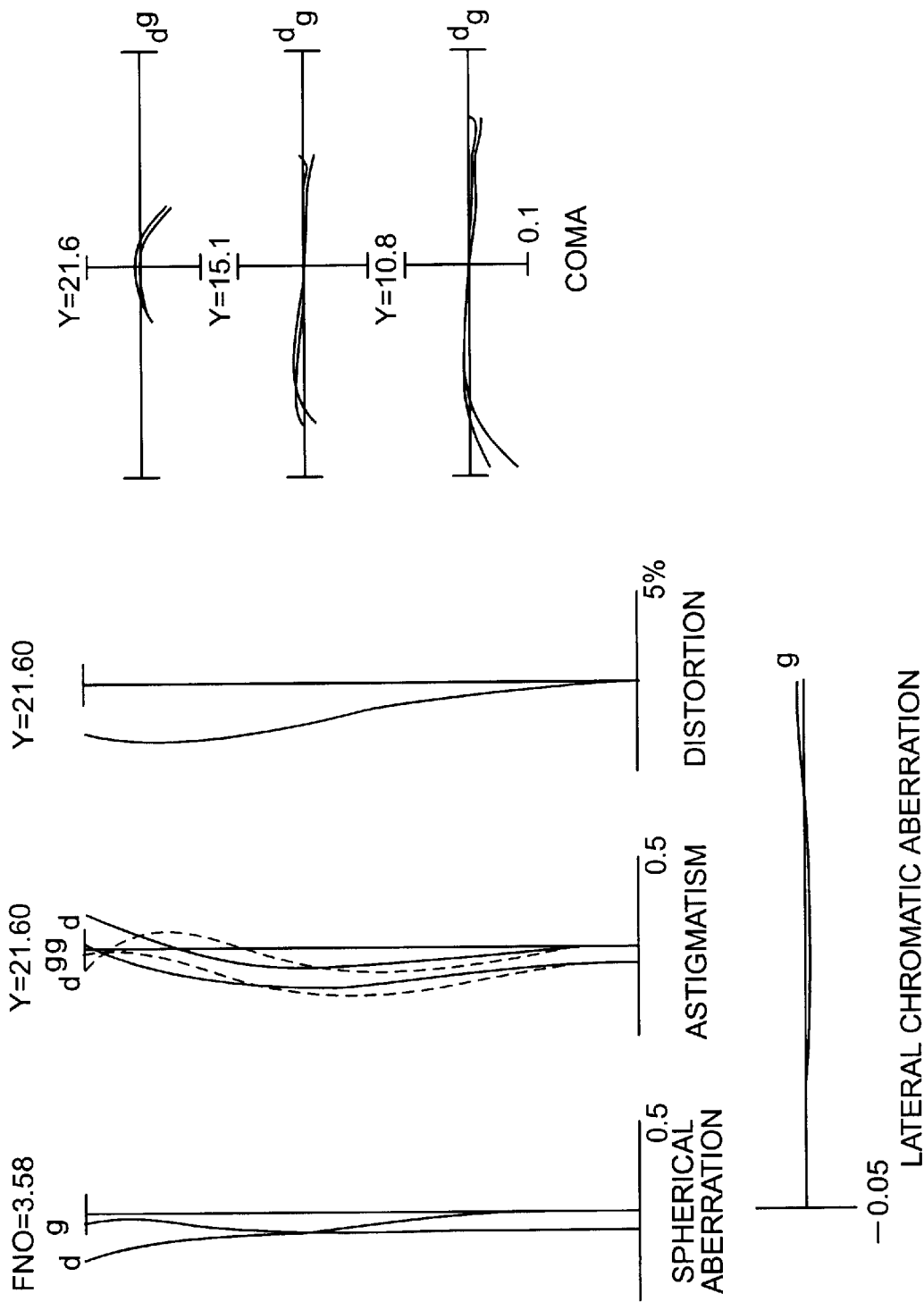
FIG. 14 graphically shows various aberrations of the zoom lens system according to Example 4 of the second embodiment in a wide-angle end state when the system is focused at infinity.
Figure 15:
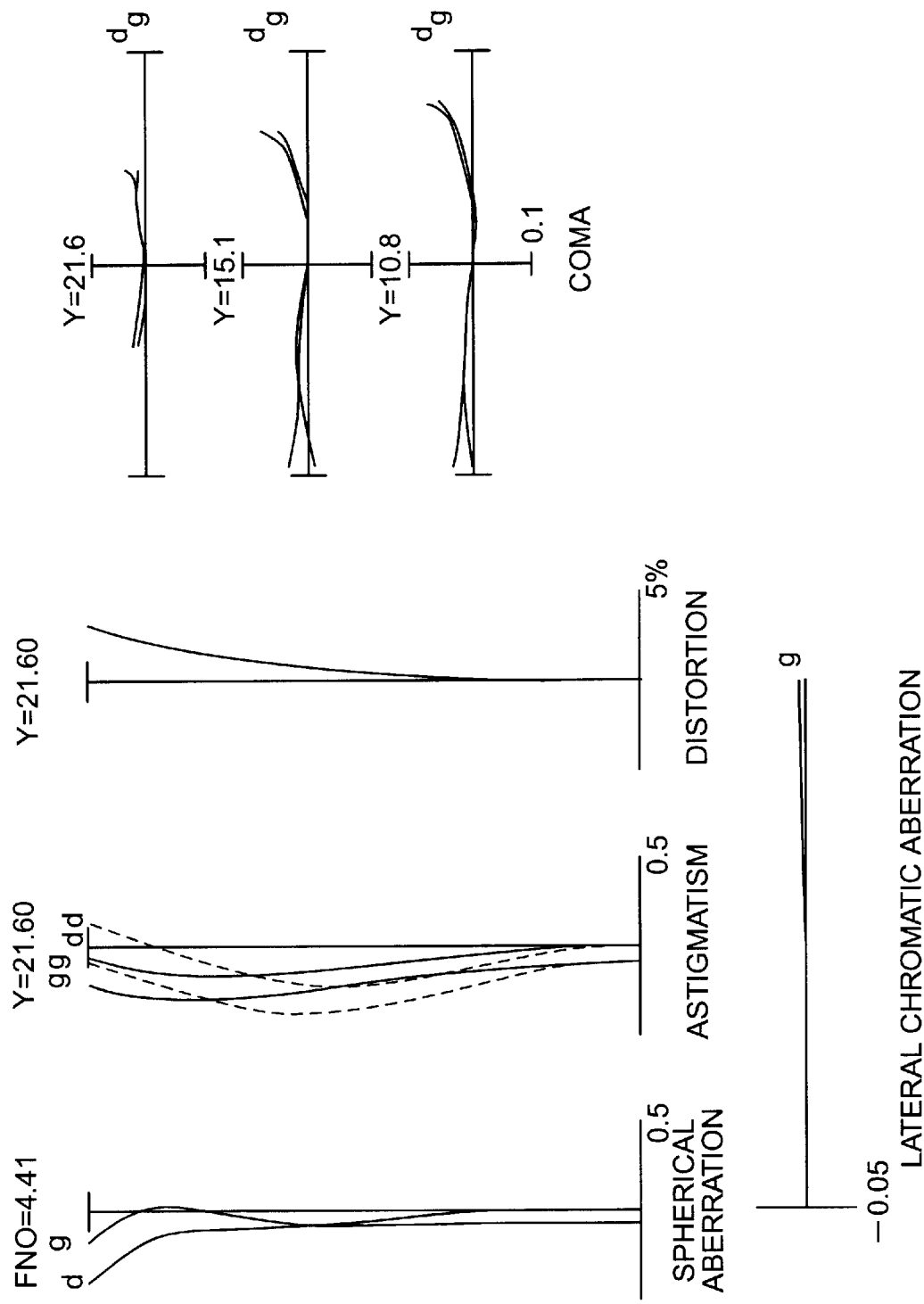
FIG. 15 graphically shows various aberrations of the zoom lens system according to Example 4 of the second embodiment in an intermediate focal length state when the system is focused at infinity.
Figure 16:
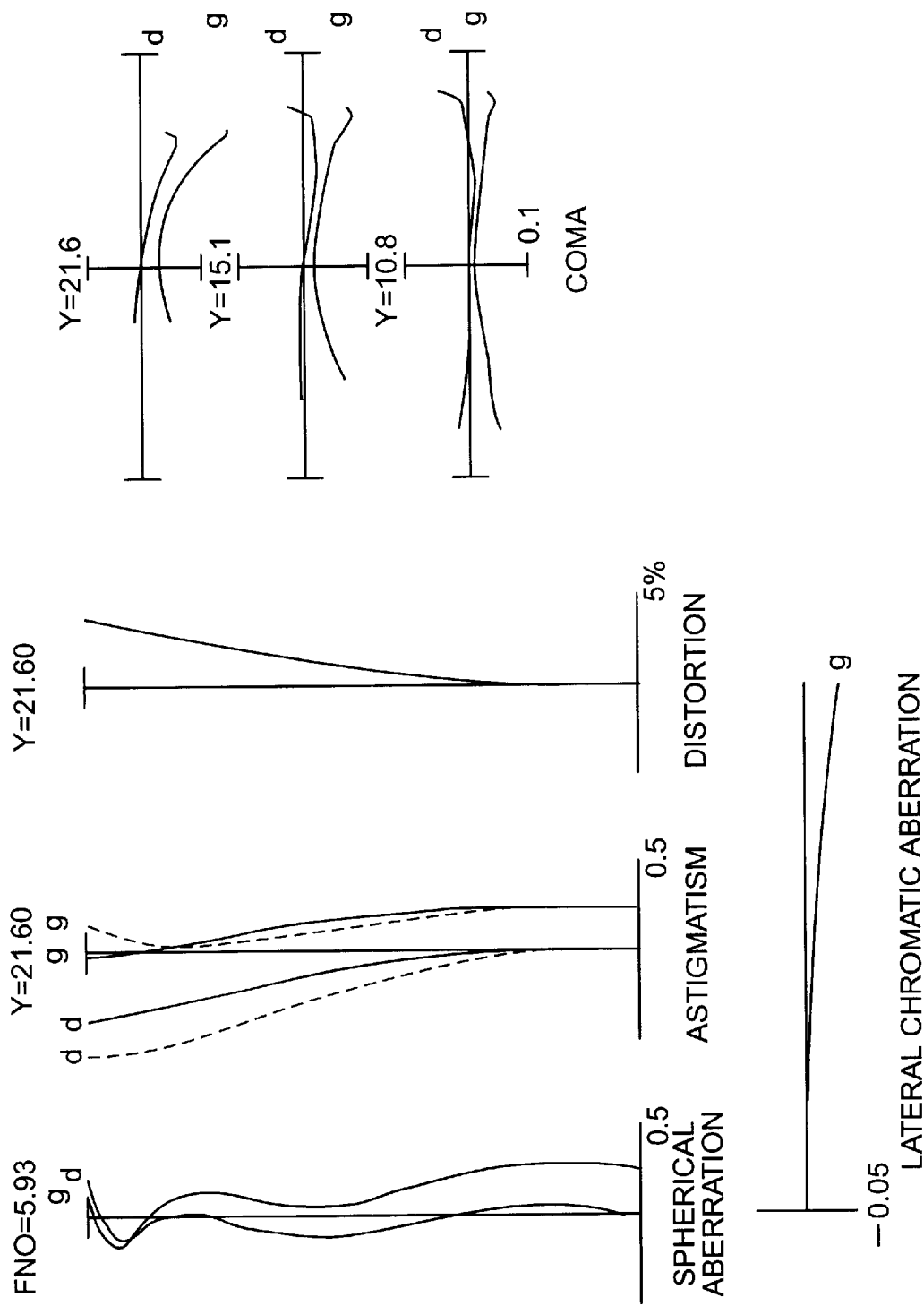
FIG. 16 graphically shows various aberrations of the zoom lens system according to Example 4 of the second embodiment in a telephoto end state when the system is focused at infinity.

FIG. 14 graphically shows various aberrations of the zoom lens system according to Example 4 of the second embodiment in a wide-angle end state when the system is focused at infinity. FIG. 15 graphically shows various aberrations of the zoom lens system according to Example 4 of the second embodiment in an intermediate focal length state when the system is focused at infinity. FIG. 16 graphically shows various aberrations of the zoom lens system according to Example 4 of the second embodiment in a telephoto end state when the system is focused at infinity.

As is apparent from the respective graphs showing various aberrations, excellent compensation is made for various aberrations up to large angle of view in the wide-angle end state, in the intermediate focal length state, and in the telephoto end state.

EXAMPLE 5

Figure 17:
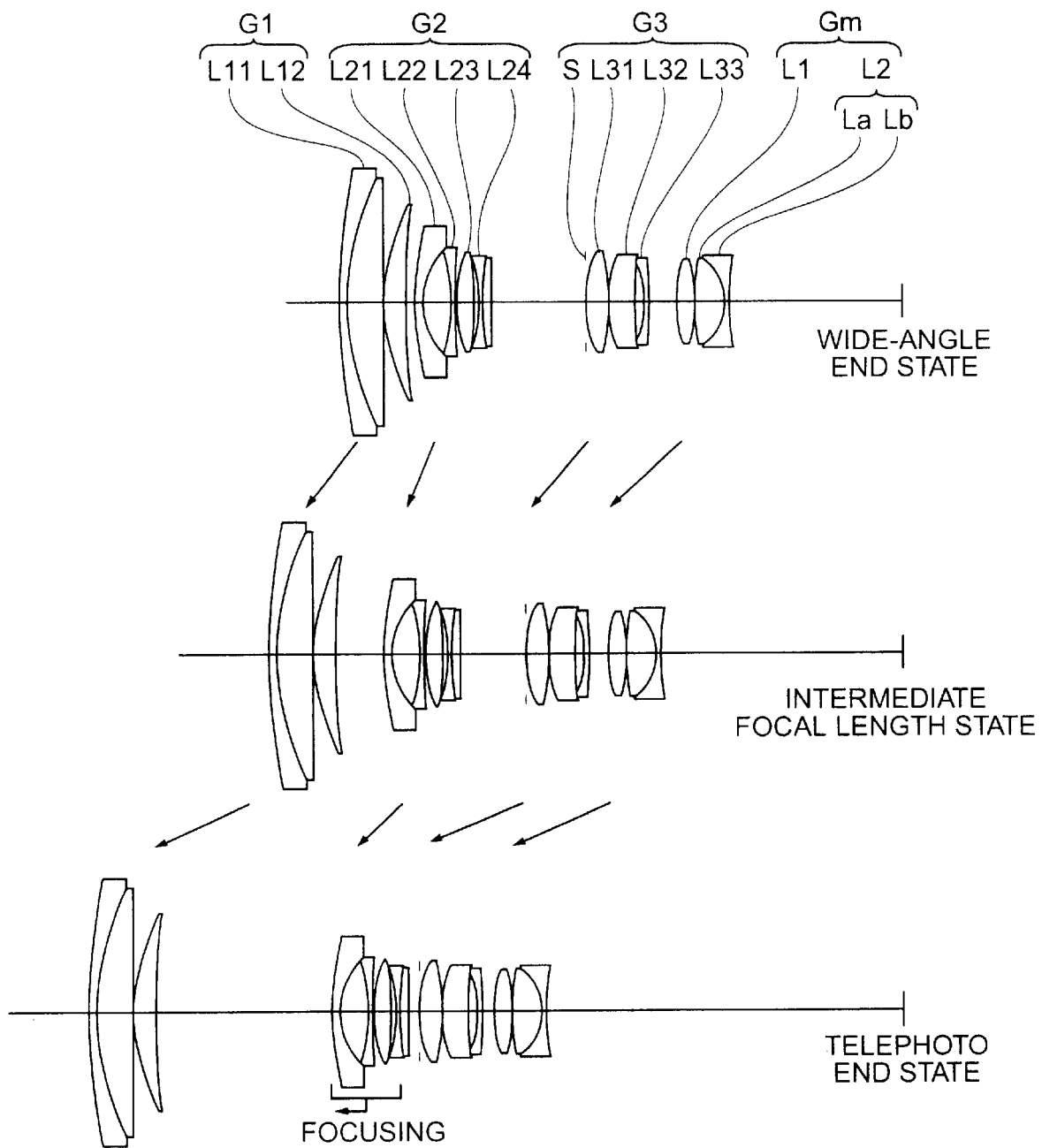
FIG. 17 is a diagram showing the lens arrangement of a zoom lens system according to Example 5 of the second embodiment of the present invention, together with the movement of each lens group during zooming.

FIG. 17 is a diagram showing the lens arrangement of a zoom lens system according to Example 5 of the second embodiment of the present invention, together with the movement of each lens group during zooming. A zoom lens system according to Example 5 of the second embodiment is composed of four lens groups having positive-negative-positive-positive arrangement. The zoom lens system consists of, in order from an object, a first lens group G1 having positive refractive power, a second lens group G2 having negative refractive power, a third lens group G3 having positive refractive power, and a fourth lens group Gm having positive refractive power.

The first lens group G1 consists of, in order from the object, a cemented positive lens L11 constructed by a negative meniscus lens having a convex surface facing to the object side cemented with a double convex positive lens, and a positive meniscus lens L12 having a convex surface facing to the object side. The second lens group G2 consists of, in order from the object, a negative meniscus composite lens L21 composed of glass and resin materials having an aspherical surface facing to the object side, a double concave negative lens L22, a double convex positive lens L23, and a cemented lens L24 constructed by a double concave negative lens cemented with a double convex positive lens. The third lens group G3 consists of, in order from the object, an aperture stop S, a double convex positive lens L31, a positive meniscus lens L32, and a negative meniscus lens L33 having a concave surface facing to the object side. The fourth lens group Gm consists of, in order from the object, a double convex positive lens L1 having aspherical surfaces on both sides, and a cemented negative lens L2 constructed by a positive lens element La cemented with a negative lens element Lb.

When the state of lens group positions is changed from a wide-angle end state to a telephoto end state, all lens groups are moved independently such that the space between the first lens group G1 and the second lens group G2 increases, the space between the second lens group G2 and the third lens group G3 decreases, and the space between the third lens group G3 and the fourth lens group Gm decreases. The focusing from the infinity to a closer object is carried out by moving the second lens group G2 to the object side.

Various values associated with Example 5 are listed in Table 5.

TABLE 5

(Specifications)
f: 29.1~192 mm
2ω: 74.8°~12.48°
FNO: 3.59~5.90

(Lens Data)

| | r | d | ν | n |
|---|---|---|---|---|
| 1) | 114.9003 | 1.8000 | 27.51 | 1.755200 |
| 2) | 54.8446 | 9.2000 | 70.41 | 1.487490 |
| 3) | −348.9538 | 0.1000 | | 1.000000 |
| 4) | 42.8308 | 4.8500 | 65.47 | 1.603000 |
| 5) | 126.0775 | D5 | | 1.000000 |
| 6) | 145.3498 | 0.0500 | 38.09 | 1.553890 |
| 7) | 120.0000 | 1.6000 | 46.58 | 1.804000 |
| 8) | 14.9008 | 6.0000 | | 1.000000 |
| 9) | −41.9845 | 0.8000 | 52.67 | 1.741000 |
| 10) | 47.4027 | 0.3475 | | 1.000000 |
| 11) | 29.0279 | 4.6000 | 26.52 | 1.761820 |
| 12) | −44.1807 | 1.0000 | | 1.000000 |
| 13) | −23.9767 | 0.8000 | 46.58 | 1.804000 |
| 14) | 278.0169 | 1.7000 | 26.52 | 1.761820 |
| 15) | −93.7726 | D15 | | 1.000000 |
| 16> | Aperture Stop | 0.5000 | | 1.000000 |
| 17) | 24.1929 | 5.5000 | 82.52 | 1.497820 |
| 18) | −43.7416 | 0.1000 | | 1.000000 |
| 19) | 26.0219 | 5.3391 | 64.10 | 1.516800 |
| 20) | 88.9088 | 2.980 | | 1.000000 |
| 21) | −22.0092 | 1.0000 | 23.78 | 1.846660 |
| 22) | −74.4805 | D22 | | 1.000000 |
| 23) | 66.2391 | 4.0465 | 64.10 | 1.516800 |
| 24) | −21.0448 | 0.2854 | | 1.000000 |
| 25) | 52.3147 | 5.9521 | 40.75 | 1.581440 |
| 26) | −10.9769 | 1.5000 | 46.63 | 1.816000 |
| 27) | 56.2263 | BE | | 1.000000 |

(Aspherical Data)

Surface Number 6

κ = −99.9999
C3 = 0.53019E-5
C4 = 1.07660E-5
C5 = 0.57302E-7
C6 = −8.86250E-8
C8 = 6.40100E-10
C10 = −2.25360E-12
C12 = 0.19703E-14
C14 = 0.41415E-17

Surface Number 23

κ = 15.2437
C3 = −0.72476E-6
C4 = 9.43290E-6
C5 = −0.29308E-6
C6 = 2.81800E-7
C8 = 1.58600E-10
C10 = 1.12040E-11
C12 = 0.16027E-14

Surface Number 24

κ = −0.4049
C3 = 0.39752E-5
C4 = 4.97180E-6
C5 = −0.31790E-7
C6 = 7.30560E-8
C8 = 1.23550E-9
C10 = 1.12690E-12
C12 = −0.10216E-13

(Variable intervals upon zooming)

| | 1-POS | 2-POS | 3-POS |
|---|---|---|---|
| f | 29.1 | 50. | 192. |

TABLE 5-continued (Specifications)
f: 29.1~192 mm
2ω: 74.8°~12.48°
FNO: 3.59~5.90

| | | | |
|---|---|---|---|
| D0 | ∞ | ∞ | ∞ |
| D5: | 2.74044 | 12.40319 | 39.20386 |
| D15: | 19.63621 | 13.06935 | 1.19357 |
| D22: | 5.89438 | 3.72725 | 1.79502 |

| | 4-POS | 5-POS | 6-POS |
|---|---|---|---|
| β | −0.03333 | −0.03333 | −0.03333 |
| D0 | 816.5306 | 1410.6712 | 4995.1770 |
| D5: | 2.16565 | 11.89021 | 37.45769 |
| D15: | 20.21099 | 13.58233 | 2.93974 |
| D22: | 5.89438 | 3.72725 | 1.79502 |

| | 7-POS | 8-POS | 9-POS |
|---|---|---|---|
| β | −0.10403 | −0.17092 | −0.37354 |
| D0 | 226.1397 | 210.6606 | 171.7931 |
| D5: | 0.98701 | 9.89633 | 29.54829 |
| D15: | 21.38964 | 15.57621 | 10.84914 |
| D22: | 5.89438 | 3.72725 | 1.79502 |

(Values for the conditional expressions)

(8): Σdw/ft = 0.460
(9): f1/ft = 0.418
(10): nb − na = 0.23456

Figure 18:
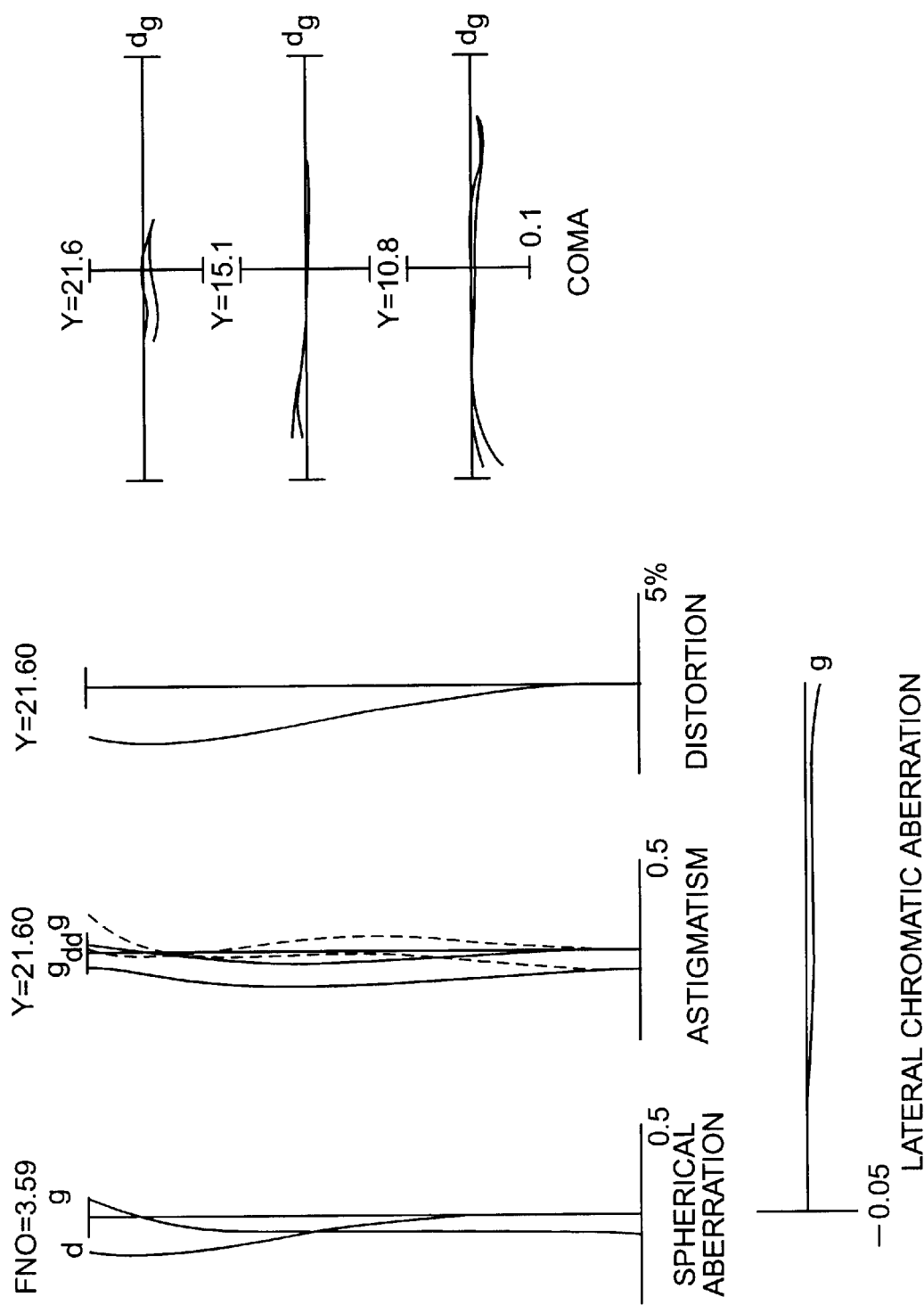
FIG. 18 graphically shows various aberrations of the zoom lens system according to Example 5 of the second embodiment in a wide-angle end state when the system is focused at infinity.
Figure 19:
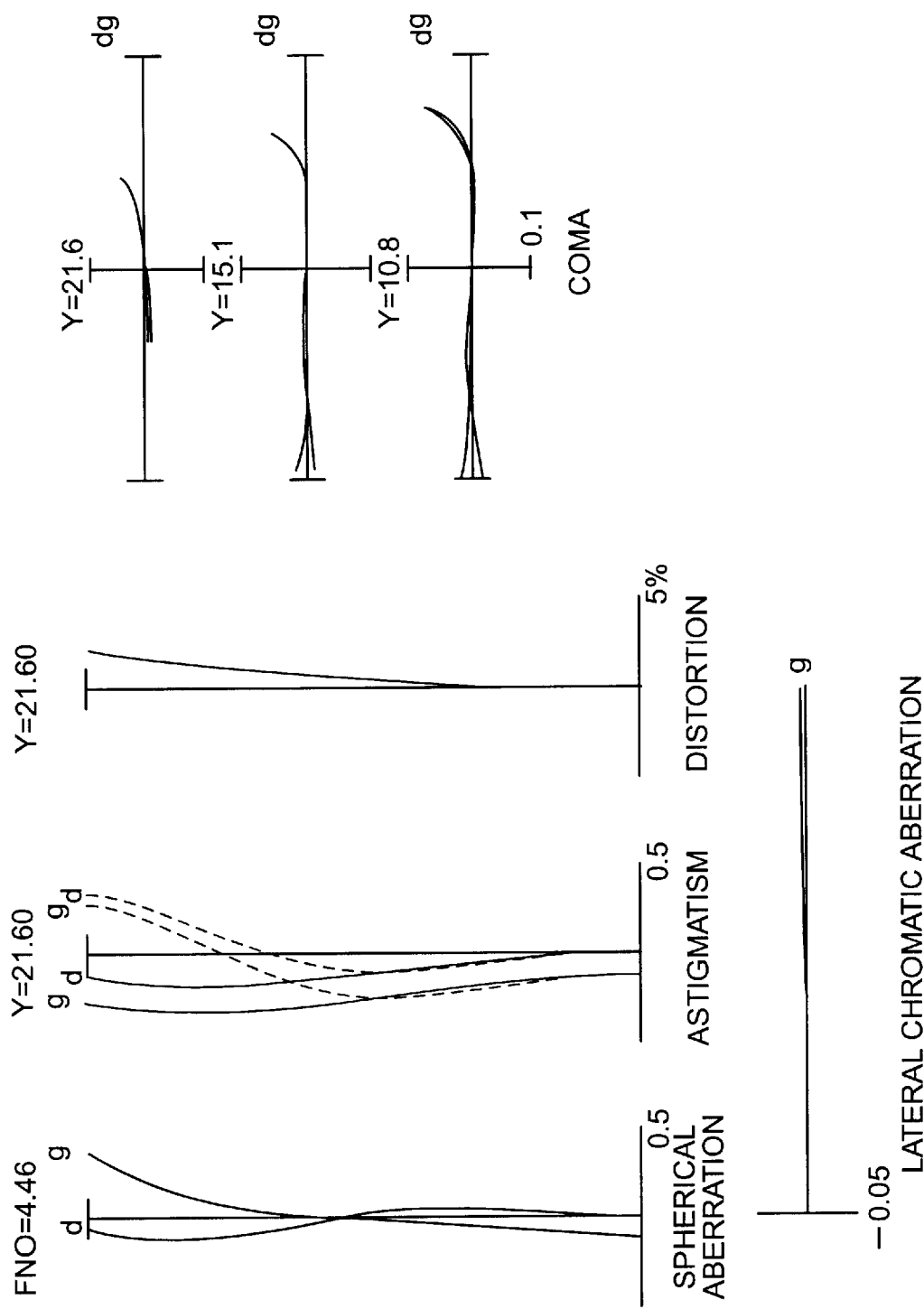
FIG. 19 graphically shows various aberrations of the zoom lens system according to Example 5 of the second embodiment in an intermediate focal length state when the system is focused at infinity.
Figure 20:
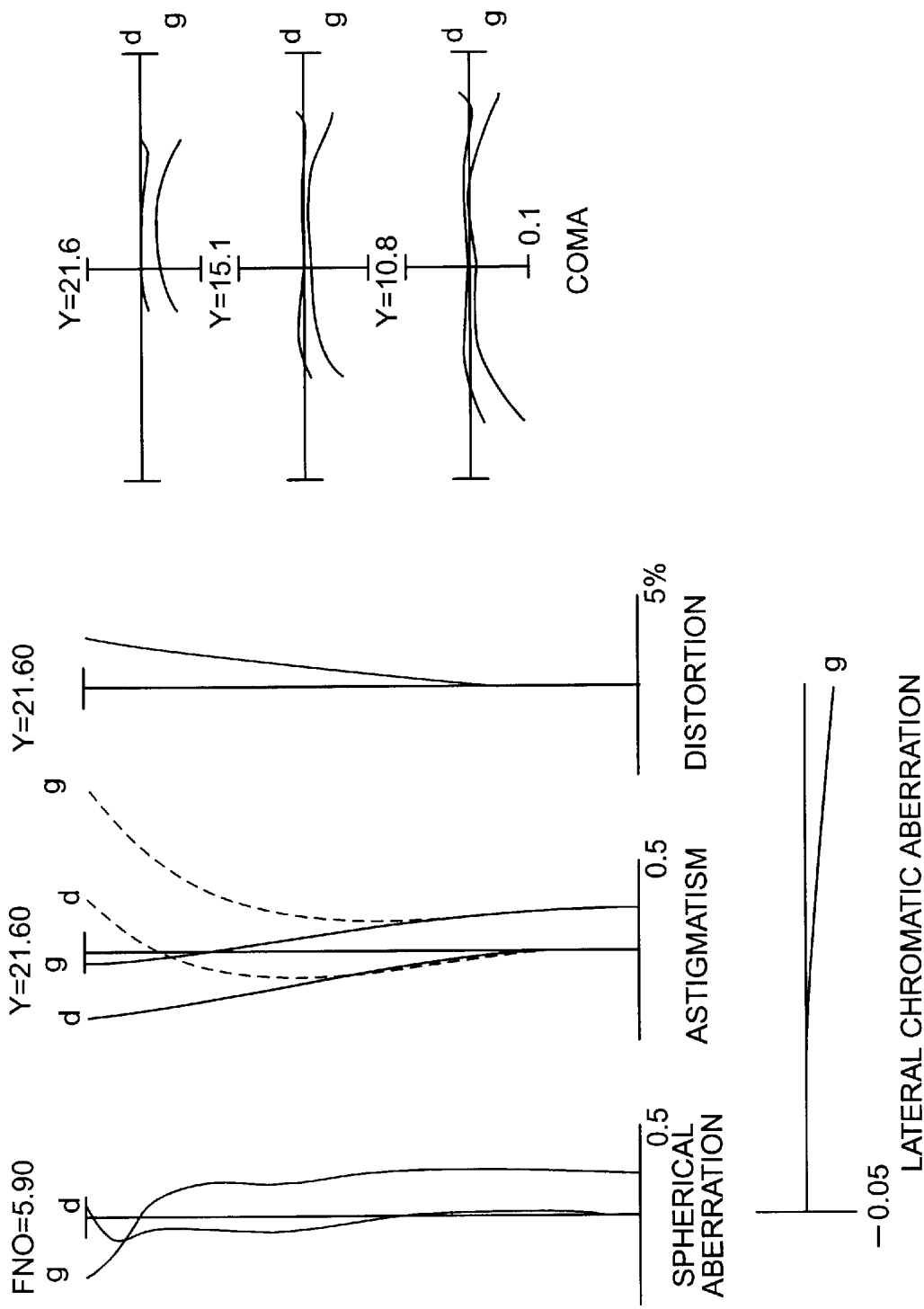
FIG. 20 graphically shows various aberrations of the zoom lens system according to Example 5 of the second embodiment in a telephoto end state when the system is focused at infinity.

FIG. 18 graphically shows various aberrations of the zoom lens system according to Example 5 of the second embodiment in a wide-angle end state when the system is focused at infinity. FIG. 19 graphically shows various aberrations of the zoom lens system according to Example 5 of the second embodiment in an intermediate focal length state when the system is focused at infinity. FIG. 20 graphically shows various aberrations of the zoom lens system according to Example 5 of the second embodiment in a telephoto end state when the system is focused at infinity.

As is apparent from the respective graphs showing various aberrations, excellent compensation is made for various aberrations up to large angle of view in the wide-angle end state, in the intermediate focal length state, and in the telephoto end state.

In each Example of each Embodiment, the aperture stop is arranged directly before the third lens group.

However, the aperture stop may be arranged in the third lens group or directly before the fourth lens group.

The aspherical surfaces introduced in the present invention can be replaced by any optical element having same optical effect in consequence such as a graded index optical element, a diffractive optical element, and a hybrid optical element constructed by a diffractive optical element connected with a refractive optical element. It is needless to say that an optical system whose aspherical surface is replaced by such an optical element is also included in the scope of the present invention.

The present invention makes it possible to provide a zoom lens system with an angle of view 2ω of about 74.1° to 11.8° and a zoom ratio of about 6.6, being ultimately small in diameter and compact, being composed of less number of elements, and having high cost performance and superb optical performance.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object:
   a first lens group having positive refractive power;
   a second lens group having negative refractive power;
   at least one further lens group; and
   a lens group having positive refractive power as a whole:
      wherein the focal length of the zoom lens system is varied by changing an air space between the first lens group and the second lens group;
      wherein the lens group having positive refractive power as a whole consists of, in order from the object:
         a positive lens component having a convex surface facing to an image side; and
         a negative lens component having a concave surface facing to the object side; and
      wherein the following conditional expression is satisfied:

$$0.10 < \Sigma dw/ft < 0.54$$

where $\Sigma dw$ denotes a distance along the optical axis between the vertex of the object side surface of the most object side lens element and that of the image side surface of the most image side lens element in a wide-angle end state and $ft$ denotes the focal length of the zoom lens system in a telephoto end state.

2. The zoom lens system according to claim 1, wherein the following conditional expression is satisfied:

$$0.20 < f1/ft < 0.55$$

where $f1$ denotes the focal length of the first lens group.

3. The zoom lens system according to claim 2, wherein the following conditional expression is satisfied:

$$0.03 < |f2|/ft < 0.20$$

where $f2$ denotes the focal length of the second lens group.

4. The zoom lens system according to claim 3, wherein the following conditional expression is satisfied:

$$0.23 < dpn/dm < 0.90$$

where $dpn$ denotes a distance along the optical axis between the image side vertex of the positive lens component and the object side vertex of the negative lens component in the lens group having positive refractive power as a whole, and $dm$ denotes a distance along the optical axis between the object side vertex of the most object side lens element and the image side vertex of the most image side lens element of the lens group having positive refractive power as a whole.

5. The zoom lens system according to claim 4, wherein at least one aspherical surface is included in either the positive lens component or the negative lens component in the lens group having positive refractive power as a whole.

6. The zoom lens system according to claim 5, wherein the at least one further lens group consists only of a third lens group having positive refractive power, and wherein the following conditional expression is satisfied:

$$0.2 < f3/fm < 1.0$$

where $f3$ denotes the focal length of the third lens group and $fm$ denotes the focal length of the lens group having positive refractive power as a whole.

7. The zoom lens system according to claim 2, wherein the following conditional expression is satisfied:

$$0.23 < dpn/dm < 0.90$$

where $dpn$ denotes a distance along the optical axis between the image side vertex of the positive lens component and the object side vertex of the negative lens component in the lens group having positive refractive power as a whole, and $dm$ denotes a distance along the optical axis between the object side vertex of the most object side lens element and the image side vertex of the most image side lens element of the lens group having positive refractive power as a whole.

8. The zoom lens system according to claim 2, wherein at least one aspherical surface is included in both positive lens component and negative lens component in the lens group having positive refractive power as a whole, and wherein at least one of the aspherical surfaces has a shape that positive refractive power of a single lens element becomes weak or negative refractive power of a single lens element becomes strong as the height goes from the optical axis to the periphery of the lens element.

9. The zoom lens system according to claim 8, wherein the positive lens component in the lens group having positive refractive power as a whole is constructed by double aspherical surfaces, and wherein the image side surface of the double aspherical lens has a shape that the curvature in the periphery of the effective aperture becomes larger than that on the optical axis.

10. The zoom lens system according to claim 1, wherein the following conditional expression is satisfied:

$$0.03 < |f2|/ft < 0.20$$

where $f2$ denotes the focal length of the second lens group.

11. The zoom lens system according to claim 1, wherein the following conditional expression is satisfied:

$$0.23 < dpn/dm < 0.90$$

where $dpn$ denotes a distance along the optical axis between the image side vertex of the positive lens component and the object side vertex of the negative lens component in the lens group having positive refractive power as a whole, and $dm$ denotes a distance along the optical axis between the object side vertex of the most object side lens element and the image side vertex of the most image side lens element of the lens group having positive refractive power as a whole.

12. The zoom lens system according to claim 11, wherein at least one aspherical surface is included in both positive lens component and negative lens component in the lens group having positive refractive power as a whole, and wherein at least one of the aspherical surfaces has a shape that positive refractive power of a single lens element becomes weak or negative refractive power of a single lens element becomes strong as the height goes from the optical axis to the periphery of the lens element.

13. The zoom lens system according to claim 12, wherein the positive lens component in the lens group having positive refractive power as a whole is constructed by double aspherical surfaces, and wherein the image side surface of the double aspherical lens has a shape that the curvature in the periphery of the effective aperture becomes larger than that on the optical axis.

14. The zoom lens system according to claim 11, wherein the second lens group has at least one negative lens element and at least one positive lens element, and wherein the following conditional expressions are satisfied:

$$np<1.85$$

$$vp<27$$

where np denotes refractive index of the positive lens element at d-line and vp denotes Abbe number of the positive lens element.

15. The zoom lens system according to claim 1, wherein at least one aspherical surface is included in either the positive lens component or the negative lens component in the lens group having positive refractive power as a whole.

16. The zoom lens system according to claim 1, wherein the at least one further lens group consists only of a third lens group having positive refractive power, and wherein the following conditional expression is satisfied:

$$0.2<f3/fm<1.0$$

where f3 denotes the focal length of the third lens group and fm denotes the focal length of the lens group having positive refractive power as a whole.

17. The zoom lens system according to claim 1, wherein at least one aspherical surface is included in both positive lens component and negative lens component in the lens group having positive refractive power as a whole, and wherein at least one of the aspherical surfaces has a shape that positive refractive power of a single lens element becomes weak or negative refractive power of a single lens element becomes strong as the height goes from the optical axis to the periphery of the lens element.

18. The zoom lens system according to claim 17, wherein the positive lens component in the lens group having positive refractive power as a whole is constructed by double aspherical surfaces, and wherein the image side surface of the double aspherical lens has a shape that the curvature in the periphery of the effective aperture becomes larger than that on the optical axis.

19. The zoom lens system according to claim 1, wherein the negative lens component in the lens group having positive refractive power as a whole has at least one aspherical surface, and wherein the aspherical surface has a shape that negative refractive power in the most peripheral part of the effective aperture becomes stronger than that on the optical axis.

20. The zoom lens system according to claim 1, wherein the second lens group has at least one negative lens element and at least one positive lens element, and wherein the following conditional expressions are satisfied:

$$np<1.85$$

$$vp<27$$

where np denotes refractive index of the positive lens element at d-line and vp denotes Abbe number of the positive lens element.

21. A zoom lens system comprising, in order from an object:

a first lens group having positive refractive power;

a second lens group having negative refractive power;

at least one lens group; and an additional lens group having positive refractive power:

wherein the focal length of the zoom lens system is varied by changing an air space between the first lens group and the second lens group;

wherein the additional lens group having positive refractive power consists of, in order from the object;

a positive lens component with a convex surface facing to an image side; and a negative lens component;

wherein the negative lens component includes a positive lens element and a negative lens element; and wherein the following conditional expression is satisfied:

$$0.10<\Sigma dw/ft<0.54$$

where $\Sigma dw$ denotes a distance along the optical axis between the vertex of the object side surface of the most object side lens element and that of the image side surface of the most image side lens element in a wide-angle end state and ft denotes the focal length of the zoom lens system in a telephoto end state.

22. The zoom lens system according to claim 21, wherein the following conditional expression is satisfied:

$$0.20<f1/ft<0.85$$

where f1 denotes the focal length of the first lens group.

23. The zoom lens system according to claim 22, wherein the positive lens component with a convex surface facing to the object in the additional lens group having positive refractive power has at least one aspherical surface, and wherein the aspherical surface has a shape that the curvature becomes small as the height goes from the optical axis to the periphery of the surface.

24. The zoom lens system according to claim 23, wherein the positive lens component with a convex surface facing to the object in the additional lens group having positive refractive power has aspherical surfaces on both object side and image side, wherein the object side surface of the aspherical surfaces has a shape that the curvature becomes large as the height goes from the optical axis to the periphery of the surface, and wherein the image side surface of the aspherical surfaces has a shape that the curvature becomes small as the height goes from the optical axis to the periphery of the surface.

25. The zoom lens system according to claim 24, wherein the following conditional expression is satisfied:

$$0.10<nb-na$$

where na denotes refractive index of the positive lens element in the negative lens component in the additional lens group having positive refractive power at d-line and nb denotes that of the negative lens element in the negative lens component in the additional lens group having positive refractive power at d-line.

26. The zoom lens system according to claim 25, wherein the positive lens element and the negative lens element in the negative lens component in the additional lens group having positive refractive power are cemented with each other.

27. The zoom lens system according to claim 21, wherein the positive lens component with a convex surface facing to the object in the additional lens group having positive refractive power has at least one aspherical surface, and wherein the aspherical surface has a shape that the curvature becomes small as the height goes from the optical axis to the periphery of the surface.

28. The zoom lens system according to claim 27, wherein the positive lens element and the negative lens element in the negative lens component in the additional lens group having positive refractive power are cemented with each other.

29. The zoom lens system according to claim 21, wherein the positive lens component with a convex surface facing to the object in the additional lens group having positive refractive power has aspherical surfaces on both object side and image side, wherein the object side surface of the aspherical surfaces has a shape that the curvature becomes large as the height goes from the optical axis to the periphery of the surface, and wherein the image side surface of the aspherical surfaces has a shape that the curvature becomes small as the height goes from the optical axis to the periphery of the surface.

30. The zoom lens system according to claim 29, wherein the positive lens element and the negative lens element in the negative lens component in the additional lens group having positive refractive power are cemented with each other.

31. The zoom lens system according to claim 21, wherein the following conditional expression is satisfied:

$$0.10 < nb-na$$

where na denotes refractive index of the positive lens element in the negative lens component in the additional lens group having positive refractive power at d-line and nb denotes that of the negative lens element in the negative lens component in the additional lens group having positive refractive power at d-line.

32. The zoom lens system according to claim 31, wherein the positive lens element and the negative lens element in the negative lens component in the additional lens group having positive refractive power are cemented with each other.

33. The zoom lens system according to claim 21, wherein the positive lens element and the negative lens element in the negative lens component in the additional lens group having positive refractive power are cemented with each other.

34. A zoom lens system comprising, in order from an object:
  a first lens group having positive refractive power;
  a second lens group having negative refractive power;
  at least one lens group; and
  a lens group having positive refractive power as a whole:
  wherein the focal length of the zoom lens system is varied by changing an air space between the first lens group and the second lens group;
  wherein the lens group having positive refractive power as a whole consists of, in order from the object:
  a positive lens component having a convex surface facing to an image side; and
  a negative lens component having a concave surface facing to the object side;
  wherein the second lens group has at least one negative lens element and at least one positive lens element; and
  wherein the following conditional expressions are satisfied:

$$np < 1.85$$
$$vp < 27$$

where np denotes refractive index of the positive lens element at d-line and vp denotes Abbe number of the positive lens element.

* * * * *

UNITED STATES PATENT AND TRADEMARK OFFICE
CERTIFICATE OF CORRECTION

PATENT NO.   : 6,621,643 B2
DATED        : September 16, 2003
INVENTOR(S)  : Haruo Sato It is certified that error appears in the above-identified patent and that said Letters Patent is hereby corrected as shown below:

<u>Title page,</u>
Item [30], Foreign Application Priority Data should read:

-- Apr. 25, 2001   (JP) ............ 2001-127816
        Apr. 25, 2001   (JP) ............ 2001-127830 --

Signed and Sealed this

Sixth Day of January, 2004

JAMES E. ROGAN
*Director of the United States Patent and Trademark Office*